US012487061B2

(12) United States Patent
Berryman et al.

(10) Patent No.: US 12,487,061 B2
(45) Date of Patent: Dec. 2, 2025

(54) PANEL ASSEMBLY, A PANEL, A MOUNTING ARRANGEMENT AND METHOD OF SECURING SAME TO A SURFACE

(71) Applicant: RHINO HIDE PTY LTD, Balcatta (AU)

(72) Inventors: Marc John Berryman, Balcatta (AU); Rod Houston, Balcatta (AU)

(73) Assignee: RHINO HIDE PTY LTD, Balcatta (AU)

( * ) Notice: Subject to any disclaimer, the term of this patent is extended or adjusted under 35 U.S.C. 154(b) by 394 days.

(21) Appl. No.: 18/088,251

(22) PCT Filed: Jun. 25, 2021

(86) PCT No.: PCT/AU2021/050678
§ 371 (c)(1),
(2) Date: Dec. 23, 2022

(87) PCT Pub. No.: WO2021/258162
PCT Pub. Date: Dec. 30, 2021

(65) Prior Publication Data
US 2023/0130216 A1    Apr. 27, 2023

(30) Foreign Application Priority Data

Jun. 25, 2020  (AU) ................................ 2020902125
Feb. 17, 2021  (AU) ................................ 2021900403

(51) Int. Cl.
*F41H 5/013*      (2006.01)
*B60J 11/06*      (2006.01)
(Continued)

(52) U.S. Cl.
CPC .............. *F41H 5/013* (2013.01); *B60J 11/06* (2013.01); *F16B 5/0642* (2013.01); *B60J 11/04* (2013.01); *B60J 11/08* (2013.01)

(58) Field of Classification Search
CPC ......... F41H 5/013; F16B 5/0642; B60J 11/02; B60J 11/04; B60J 11/06
See application file for complete search history.

(56) References Cited

U.S. PATENT DOCUMENTS 3,449,004 A    6/1969  Anderson
3,488,815 A    1/1970  Metz
(Continued)

FOREIGN PATENT DOCUMENTS

EP         2453198 B1    6/2020

OTHER PUBLICATIONS

International Search Report AND Written Opinion of the International Searching Authority for International Application No. PCT/AU2021/050678 dated Aug. 20, 2021.

*Primary Examiner* — Jeffrey J Restifo
(74) *Attorney, Agent, or Firm* — Harness, Dickey & Pierce, PLC

(57) ABSTRACT

The present invention provides a panel comprising a protective plate which is adapted to be fitted to a vehicle body panel to cover the vehicle body panel. The protective plate includes a plurality of fasteners to releasably secure the protective plate to the vehicle body panel. Each fastener comprises a first fastening portion which is secured to the protective plate, and a second fastening portion which is secured to the surface of the vehicle's body panel. Upon securing the protective plate in place, the first fastening portion is biased away from the second fastening portion to retain the fastener in a locked position. The protective plate is adapted to remain fixed to the vehicle body panel when the vehicle is driven in either an on-road or off-road environment.

25 Claims, 16 Drawing Sheets

(51) Int. Cl.
*F16B 5/06* (2006.01)
*B60J 11/04* (2006.01)
*B60J 11/08* (2006.01)

(56) References Cited

U.S. PATENT DOCUMENTS

| | | | | |
|---|---|---|---|---|
| 4,792,475 | A * | 12/1988 | Bien | F16B 5/02 |
| | | | | 411/908 |
| 5,799,975 | A * | 9/1998 | Crick | B25H 3/04 |
| | | | | 150/166 |
| 5,868,425 | A * | 2/1999 | McNulty | B60J 11/06 |
| | | | | 150/166 |
| 5,945,194 | A * | 8/1999 | Pester | B60J 11/06 |
| | | | | 428/192 |
| 7,695,053 | B1 * | 4/2010 | Boczek | F41H 7/044 |
| | | | | 296/193.06 |
| 8,746,301 | B2 * | 6/2014 | Barnes | F16B 47/006 |
| | | | | 206/829 |
| 9,482,491 | B1 * | 11/2016 | Luster | F41H 5/013 |
| 9,499,112 | B1 * | 11/2016 | Straw | B60J 11/06 |
| 10,124,742 | B2 * | 11/2018 | Martinez | F16B 5/0642 |
| 11,208,055 | B2 * | 12/2021 | Chou | B60R 13/04 |
| 11,208,056 | B2 * | 12/2021 | Hunt | B60R 13/043 |
| 11,602,983 | B2 * | 3/2023 | Malina | B60J 11/06 |
| 11,760,271 | B2 * | 9/2023 | Low | B60R 9/10 |
| | | | | 296/39.1 |
| 11,767,872 | B2 * | 9/2023 | Beyer | F16B 19/004 |
| | | | | 29/525.03 |
| 11,944,164 | B2 * | 4/2024 | Ferrari | A44B 1/32 |
| 2005/0008458 | A1 | 1/2005 | Keech et al. | |
| 2007/0196196 | A1 | 8/2007 | Schorling et al. | |
| 2010/0007169 | A1 * | 1/2010 | Nguyen | B60J 11/06 |
| | | | | 296/136.07 |
| 2011/0113952 | A1 * | 5/2011 | Rosenwasser | F41H 7/04 |
| | | | | 89/937 |
| 2020/0003527 | A1 * | 1/2020 | Azhagesan | F41H 5/013 |
| 2023/0070911 | A1 * | 3/2023 | Lecky | B60R 19/42 |
| 2023/0130216 | A1 * | 4/2023 | Berryman | F16B 5/0642 |
| | | | | 89/36.09 |
| 2023/0286363 | A1 * | 9/2023 | Madrid | B60J 11/06 |

* cited by examiner

PANEL ASSEMBLY, A PANEL, A MOUNTING ARRANGEMENT AND METHOD OF SECURING SAME TO A SURFACE

CROSS-REFERENCE TO RELATED APPLICATIONS

This application is a by-pass continuation-in-part of International Application No. PCT/AU2021/050678, filed on Jun. 25, 2021, which claims priority to Australian Application No. 2021900403, filed on Feb. 17, 2021, and Australian Application No. 2020902125, filed on Jun. 25, 2020. Priority is also claimed to Australian Application No. 2022901559, filed on Jun. 7, 2022. The entire disclosures of the above applications are incorporated herein by reference

TECHNICAL FIELD

The present invention generally relates to a system and a method for mounting a panel to a surface.

In particular the present invention relates to a panel assembly, a panel system, a mounting arrangement and a method for mounting a panel to a surface.

In one application the present invention generally relates to a system for protecting an exterior of a vehicle, in particular a protective plate assembly and a protective panel used in that assembly which is mounted on an exterior surface of the vehicle.

In another application the present invention generally relates to a system for mounting an advertising panel to an exterior of a vehicle, in particular a panel assembly and an advertising panel used in that assembly is mounted on an exterior surface of the vehicle.

BACKGROUND ART

It is often desirable to mount an object to a surface. While there are many ways this may be achieved it typically requires the object and/or the surface to be modified in order to effect a sufficiently robust mount. The object may be mounted on the surface for a variety of reasons including those scenarios where the object is mounted to the surface in order to protect the surface, or where the object is in the form of an advertising platform which is mounted to a surface.

Vehicles, such as four wheel drives (4WD's), are expensive and often have a high quality painted exterior. These high-quality exteriors are susceptible to damage in the urban environment and, in the case of 4WD's, when driven in an off-road environment.

In an off-road environment, the 4WD is likely to encounter impacts all over its exterior from rocks, animals, trees, embankments and other commonly encountered off-road obstacles.

In the urban environment, protective covers for protecting the body panels of a vehicle are known. These protective covers are used when the vehicle is parked in an urban setting with the associated infrastructure.

These conventional covers are attached to the vehicle when the vehicle is parked. They protect the vehicle from light scratching encountered, for example, from falling twigs, other vehicle doors, shopping trolleys, vandals and other common urban infrastructure based light impacts.

Some of these conventional covers can remain on the vehicle body panels when the vehicle is moved, but only when the vehicle is moved over relatively smooth surfaces, such as a road, and at slow to moderate speeds.

Common forms of conventional covers can include raised strips placed along the length of door panels. These are designed to divert scratching away from commonly scratched locations, such as at door handle height.

Another common form of vehicle protection is known as a car bra/auto bra. This form of protection uses a protective strip of material or paint to stop paint chipping in commonly chipped areas.

Another form of vehicle protection is disclosed in International Patent Application WO 2015/054723 to the current applicant. This patent application discloses a protection system which uses magnets to removably secure protective plates to the exterior of an off-road vehicle. A disadvantage of this system is that the magnets do not provide a sufficiently robust connection between the protective plate and the exterior surface. As a result the protective plate could only be used when the vehicle travels at slow or moderate speeds. Furthermore, the exterior surface is prone to scratching and damage in the locale of where the magnet engages the exterior surface due to build-up of materials on the magnetic surface. In addition the protective plates have no shock absorbing characteristics.

Prior art plates and covers are generally not as effective as intended. Prior art plates generally do not provide protection from sudden impacts, they allow dirt to build up which chaffs the paint in those areas the plates touch the surface, and they do not allow the exterior to breathe, locking in moisture which compromises/weakens and damages the painted exterior surface.

In addition the means of securing some prior art plates and covers requires modification to the vehicle's panel, such as drilling into the panels to attach the plates/covers thereto. This not only damages the vehicle's panel but will also detracts a potential purchaser when looking to sell the vehicle. It can also be unsightly when using the vehicle without the plates/covers.

Furthermore, the means of securing prior art plates and covers to a vehicle generally do not accommodate curvatures incorporated in the vehicle's panels. As a result the securing means is compromised and the plates/covers can unintentionally detach from the vehicle. In a typical vehicle areas of the vehicle surface curvature varies from completely flat to curved surfaces with radii ranging between 100 cm to less than 10 cm. In addition, the localised curvature can be convex, concave or transition between the two curvatures across different parts of the vehicle panels There are other paint layer products available that are designed to protect the vehicle panels from damage through the paint layers absorbing impacts from foreign objects. These layers incorporate plastics such as polyurethane.

These paint layers are only designed to protect against commonly encountered urban impacts (such as at the lower front of a car) and are not suited for off-road protection.

Conventional covers are not suitable for protecting 4WD body panels when they are driven off-road and encounter impacts from sources uncommon in the typical urban setting.

Considering a different application, it is also popular to utilise a vehicle's exterior to place advertisements. Currently this may be in the form of a wrap applied to the vehicle or part of the vehicle, repainting the vehicle with the desired advertising, or fitting an advertising board to the vehicle. In the case of wrapping the vehicle, or repainting, the effects are costly and long term. The expense alone is sufficient to render these methods of regularly changing advertisements as prohibitive. In addition the wrapping of the vehicle regularly will cause damage to the painted surface of the vehicle panels which adds to the expense and inconvenience of using wrapping for advertising. In the case of an advertising board these are typically secured to the roof or rear of the vehicle and detract from the look of the vehicle as well as its aerodynamics.

The preceding discussion of the background art is intended to facilitate an understanding of the present invention only. The discussion is not an acknowledgement or admission that any of the material referred to is or was part of the common general knowledge as at the priority date of the application.

SUMMARY OF INVENTION

It is an object of this invention to ameliorate, mitigate or overcome, at least one disadvantage of the prior art, or which will at least provide the public with a practical choice.

Throughout the specification the term 'panel' is used to describe an object such as a protective plate, an armour plate, a digital panel/monitor, a flexible screen, a display board. Portions of the panel may be substantially planar in shape or may have one side substantially planar. The panel or a surface of the panel may be complementary in shape to the surface upon which it will be mounted.

The present invention provides a panel assembly adapted to be secured to an exterior of a vehicle, the panel assembly comprises:
  a panel having a plate body;
  a plurality of fasteners to releasably secure the plate body to the exterior of the vehicle; and
  a biasing means;
  wherein the biasing means retains the fastener in a locked position when the panel is secured on the vehicle.

The present invention provides a panel adapted to be secured to an exterior of a vehicle, the panel comprises:
  a plate body;
  a plurality of first fastening portions to secure the plate body to the vehicle; each first fastening portion is adapted to engage a corresponding second fastening portion on the exterior of the vehicle to releasable secure the plate body to the exterior of the vehicle; and
  a biasing means wherein the biasing means retains the first fastener portion and the second fastening portion in a locked position when the panel is secured to the exterior of the vehicle.

The exterior of the vehicle may be an exterior surface of the vehicle.

The biasing means may act to bias the panel away from the exterior surface of the vehicle when the panel is releasably secured to the exterior surface.

The biasing means may be in the form of a resilient material which is in a compressed state when the panel is releasably secured to the exterior of the vehicle. The resilient material may be in the form of foam or a rubber material. The resilient material may be held in a compressed state whereupon its release it returns to its normal state.

The biasing means may be in the form of a ring or washer wherein at least a portion of the ring/washer is made of a resilient material.

In another embodiment the biasing means is in the form of a spring.

In another embodiment the biasing means is in the form of a spring washer.

In another embodiment the biasing means may be provided by the fastener, and in particular the second fastening portion.

Portions of the plate body may be planar in shape.

The plate body may have an inner surface which is complementary in shape to the exterior of the vehicle to which it will be fitted. Th6ce plate body may be complementary in shape to the exterior of the vehicle to which it will be fitted. The profile of the inner surface represents an enlarged version of the exterior of the vehicle to which it will be fitted. In this regard the panel shape is projected out from the exterior of the vehicle, not a direct size replication of the vehicle surface.

The panel may incorporate one or more pressure equalisation devices, such as vents, therein. Preferably the pressure equalisation devices provide a venturi effect to also cause air to be vented out from behind the panel so that the pressure differential on each side of the panel is equalised.

When the panel is secured to the vehicle there may be a gap between the panel and the exterior of the vehicle.

When the panel is secured to the vehicle there may be a gap between the inner surface of the panel and the exterior surface of the vehicle. Under normal conditions the gap is maintained such that the panel is not in direct contact with the exterior of the vehicle.

The gap may be 2 mm to 50 mm. Preferably the gap is 5 mm. The gap may be substantially uniform across any position of the panel. In one embodiment, the gap may be governed by the fastener. In another embodiment the gap may be governed by the biasing means. The gap may be governed by the both the fastener and the biasing means.

Each of the plurality of fasteners may comprise a first fastening portion, incorporated with the plate body, and a corresponding second fastening portion adapted to be fixed to the exterior of the vehicle.

Each first fastening portion may be permanently or releasably attached to the plate body. This may include using an adhesive to attach the first fastening portion thereto.

Each second fastening portion may be permanently or releasably attached to the exterior surface of the vehicle. This is achieved without damaging the vehicle's surface or by drilling into the vehicle's surface and may include using an adhesive to attach the second fastening portion to the vehicle's surface. The adhesive may be in the form of a double sided adhesive pad. The thickness of the adhesive pad may be selected to accommodate the varying curvatures in the vehicle's surface. Two or more adhesive pads may be stacked on top of each other to accommodate slight curvatures in the vehicle's surface. A sheet of bonding material such as a metallic sheath or foil may be placed between adjacent layers of the two or more adhesive pads to increase the bond between adjacent adhesive pads.

In an alternative embodiment, the first fastening portion may be secured to the exterior of the vehicle. and the second fastening portion may be secured to the plate body.

The second fastening portion may comprise a base plate adapted to be removably secured to the exterior surface of the vehicle.

The base plate may comprise a base surface which is positioned adjacent the vehicle's surface when fitted thereto. Preferably the base surface defines the outer perimeter and shape of the base plate.

The base surface may present a flat surface, a curved convex surface or a curved concave surface. The base surface may have a profile which is similar to the profile of the surface of the vehicle's panel to which the base plate is being attached. This assists in maintaining adherence between the base plate and the vehicle's surface.

The base surface may be circular in shape. The base surface may be oval in shape. In one embodiment the length of the base surface in a X direction is longer than the length of the base surface in an Y direction. As the curvature of the panel typically extends along the longitudinal extent thereof, a base surface longer in the X direction than the Y direction will provide a greater surface area which is able to lie in closer proximity to the vehicle's surface than if the base surface was longer in the Y direction than the X direction. This assists in maintaining adherence between the base plate and the vehicle's surface.

In another embodiment, the base plate may comprise a base adapter wherein the base adapter is received in and secured to a recess formed in the base plate. The base adapter may provide the base surface.

The first fastening portion may comprise a shank adapted to lockingly engage the base plate.

The first fastening portion may comprise a threadless bolt which provides the shank. The bolt may have a head from which the shank extends. A portion of the shank remote from the head may have at least one channel extending therealong. The at least one channel may extend from a first end portion of the shank and terminate a distance from the first end. The channel may have a channel portion which is of a helix shape, and may terminate at a receiving portion of the channel.

In one aspect of the invention the shank is formed form a thin walled, hollow tube. The shank may have two channels formed in wall thereof. The two channels may be angularly spaced so as to align with each other. The receiving portion of each channel may be in the form of a hole.

In another aspect of the invention the shank is in the form of a solid rod, and has two channels formed in the external wall of the rod. The two channels may be angularly spaced so as to be opposite each other. The receiving portion of each channel may be in the form of a recess.

In another aspect of the invention the shank is in the form of a solid rod, and has a channel through the rod having a helix like shape. The receiving portion of the channel may be in the form of a bore which passes through the shank.

The base plate may provide a mating portion. The mating portion may be adapted to co-operate with the at least one channel of the first fastening portion. The mating portion may comprise a blind aperture therein. The blind aperture may receive the shank.

The mating portion may also comprise a pin which may extend across the blind aperture. When mounting a panel to a surface, an opening of the at least one channel of the shank first aligns with the pin before the shank can be further received in the base plate. By turning the bolt, the bolt moves from a receiving position wherein the end portion of the shank first enters the aperture of the base plate, to a locked position wherein the pin travels past end of the channel portion and is received in the receiving portion of the channel. The receiving portion of the shank may have a first edge which is closer to a first end of the shank than a first edge of the channel portion adjacent the receiving portion. With this arrangement, the biasing means will cause the pin to remain within the bore, ensuring the bolt will be retained in the locked position.

In an alternative embodiment, the shank may extend from the base plate and the bolt may provide the mating portion in the form of the pin.

The biasing means may act on the plate body to bias it away from the base plate when the plate body is releasably secured to the exterior of the vehicle it covers.

When the fastener is in a locked position, the biasing means causes the bolt to be biased away from the base plate. With this arrangement the pin remains captive in the receiving portion of the shank, minimising the likelihood of the pin from re-entering the channel portion and allowing the bolt to disengage the pin in the base plate, releasing the panel.

The external of the vehicle may include a body panel, a portion of a body panel, the exterior surface, or a window. The panel may be complementary in shape to the The present invention further provides a panel for protecting at least an external portion of a vehicle, the system comprises at least one panel in the form of a protective plate which is adapted to be releasably secured to the vehicle to protect the external portion to which it is releasably secured, the at least one protective plate is adapted to be complementary in shape to the external portion of the vehicle it is adapted to cover, the at least one protective plate is releasably secured to the vehicle using at least one fastener, the protection system comprises a biasing means to retain the fastener in a locked position, retaining the panel in a secure position relative to the external portion of the vehicle.

Preferably the external portion of the vehicle is a body panel of the vehicle. The external portion may also be a window of the vehicle, or a portion thereof. The external portion may also be the fuel cap.

Preferably the at least one protective plate has an outer surface which is exposed to the environment once fitted to a vehicle; and an inner surface which lies adjacent the vehicles external portion. The inner surface of the protective plate may be spaced away from the vehicle's external portion, such that there is a gap between them once fitted. The inner surface of the protective plate may be complementary in shape to the body panel it is adapted to be releasably secured. Preferably the protective plate is complementary in shape to the body panel it is adapted to be releasably secured.

Preferably one of the at least one protective plate takes the shape of, or is complementary in shape to one of the following body panels: a front quarter body panel, a rear quarter body panel, a front door panel, a rear door panel, a bonnet panel, a rear panel, a rear window, a roof panel, a rear tailgate.

The at least one protective plate may have one or more cut-outs as may be required to access the vehicle's handles, locks, petrol caps, and the like once installed thereon.

The at least one protective plate may incorporate one or more pressure equalisation devices, such as vents, therein. Preferably the pressure equalisation devices provide a venturi effect to also cause air to be vented out from behind the protective plate so that the pressure differential on each side of the protective plate is equalised.

The present invention provides a mounting arrangement adapted to releasable mount a panel to an exterior of a vehicle, the panel having a plate body, the mounting arrangement includes a plurality of fasteners, each fastener comprising a first fastening portion and a second fastening portion, the first fastening portion is adapted to be secured to the plate body, the first fastening portion is adapted to engage a corresponding second fastening portion on the exterior surface of the vehicle to releasable secure the plate body to the exterior of the vehicle, wherein the first fastening portion is biased away from the second fastening portion to retain the fastener portions in a locked position when the panel is secured to the exterior of the vehicle.

The present invention further provides a panel wherein the panel provides a protective plate which is adapted to be fitted to a vehicle body panel to cover the vehicle body panel;
  wherein the protective plate includes a plurality of fasteners to releasably secure the protective plate to the vehicle body panel, each fastener comprises a first fastening portion which is secured to the protective plate, and a second fastening portion which is secured to the surface of the vehicle body panel whereupon securing the protective plate in place, the first fastening portion is biased away from the second fastening portion to retain the fastener in a locked position; and wherein the protective plate is adapted to remain fixed to the vehicle body panel when the vehicle is driven in either an on-road or off-road environment.

By covering substantially the entire surface of a vehicle's body panel, the vehicle's body panel is protected from damage incurred from a plurality of angles when driving a vehicle off road. The fastening of the plate in a plurality of locations strengthens the attachment of the plate to the vehicle.

Preferably the protective panel is removable from the vehicles body panel.

Preferably, a base plate provides the second fastening portion, wherein the base plate is adapted to be fixed to the exterior/panel surface of the vehicle.

Preferably a spacing means is adapted to sit between the internal surface of the protective panel and the external surface of the vehicle body panel.

Preferably a gap is maintained between the internal surface of the protective panel and the external surface of the vehicle body panel.

In one aspect of the invention, the protective panel is shaped and contoured in the same manner as the body panel to which it is to be attached.

In another aspect of the invention, the protective panel conforms to the shape of the exterior surface of the body panel of a vehicle.

Preferably, the protective panel is made of thermoformed plastic.

Preferably the thermoformed plastic is acrylonitrile butadiene styrene (ABS), acrylonitrile styrene acrylate (ASA) or a combination of both.

ABS is readily available and used. ABS's hard properties make it well suited for the present use.

The protective panel may be made from polycarbonate plastic.

In yet another aspect of the invention, there is provided an arrangement of vehicle body panel protective panels, wherein the arrangement of vehicle body panel protective panels is attached to all or a selection of the vehicle's panels.

The present invention is in the form of a panel assembly for protecting at least an external portion of a vehicle, the panel assembly comprises at least one protective panel, the at least one protective panel comprising a first protective surface adapted to be releasably secured to the external portion by at least one fastener, wherein the panel assembly comprises a biasing means to retain the fastener in a locked position.

In one aspect of the invention the first protective surface is in an adjacent spaced relationship to the vehicle's external portion when releasably secured thereto.

In one embodiment, the protective panels may be adapted to cover a portion of a vehicle panel. In these embodiments more than one protective panel may be adapted to be releasably secured to the vehicle's panel.

In one embodiment, the protective panel may be adapted to cover more than one vehicle panel.

The present invention further provides a protective panel adapted to be releasably secured to a vehicle's exterior for protecting at least a portion of the vehicle's exterior, the protective panel comprises a fastening means to releasably secure the protective panel to the vehicle's exterior, the protective panel incorporating a biasing means to retain the protective panel in a releasably secured condition.

The present invention further provides a panel assembly for mounting a panel to an exterior surface of a vehicle, the panel assembly comprises:
  at least one panel adapted to be releasably secured to the vehicle's exterior surface;
  a mounting arrangement to releasably secure the at least panel to the vehicle's exterior surface,
  a biasing means to retain the at least one panel in a releasably secured condition.

The at least one panel may comprise a plate body.

The mounting arrangement comprises at least one first fastening portion and a corresponding second fastening portion.

The first fastening portion is incorporated with the at least one panel. The corresponding second fastening portion is adapted to be fixed to the exterior surface of the vehicle. While the second fastening portion is adapted to be fixed to the exterior surface of the vehicle in a manner which is difficult to remove, the second fastening portion can still be removed from the vehicle's exterior surface. This may be achieved by selecting a suitable adhesive to adhere the second fastening portion to the vehicle's exterior surface, alternatively a magnet may be utilised. The second fastening portion may be fixed to the vehicle's exterior surface without having to drill or otherwise damage the panel. Once the second fastening portion is removed from the panel, the panel is as it was before the second fastening portion was fixed thereto.

In other arrangements, the first fastening portion is adapted to be fixed to the exterior surface of the vehicle, and the corresponding second fastening portion is incorporated with the at least one panel.

The first fastening portion may comprise a threadless bolt which provides the shank. The bolt may have a head from which the shank extends. The shank may provide a channel, the channel being adapted to receive a mating portion of the second fastening portion. The channel may provide a passage along which the mating portion passes. The channel may guide the mating portion therealong, as the bolt moves between a receiving position, whereby the channel receives the mating portion as the panel is positioned on the vehicle's exterior, and a locked position in which the panel is releasably secured to the vehicle's exterior.

The channel may provide an opening for receiving the mating portion. The opening may be at a shank end distal from the bolt head. The channel may terminate between an end of the shank and the bolt head.

The channel comprises a channel portion and a receiving portion.

The channel portion extends along the shank in a helix like shape from the shank end. The channel portion has a first end, which provides the opening, and a second end.

The receiving portion may be provided at or adjacent to a second end of the channel portion. The receiving portion receives the mating portion whereupon the bolt is in the locked position. Preferably when the mating portion is received in the receiving portion the biasing means facilitates the retention of the mating portion in the receiving portion.

In one aspect of the invention an edge of the receiving portion is closer to the shank end compared to a first edge of the second end of the channel portion. The mating portion may be snugly received in the receiving portion against the edge thereof.

In another aspect of the invention the receiving portion is in the form of a slot having a first slot end closer to the shank end than a first edge of the second end of the channel portion. A second slot end may be closer to the bolt head than a second edge of the second end of the channel portion. In one arrangement the longitudinal axis of the slot may be parallel with the axis of the shank. In other arrangements the longitudinal axis of the slot may be angled relative to the axis of the shank.

Preferably there is more than one channel. The channels may be angularly spaced around the shank. The channels may be angularly spaced around the shank so as to be equally spaced from each other.

In a preferred arrangement there are two channels equally spaced on each side of the shank.

Preferably the mating portion comprises a blind bore for receiving the shank as the mating portion travels along the channel. The blind bore may be provided by a base plate, the base plate being adapted to be fixed to the vehicle's exterior.

In one aspect of the invention, the channel is in the form of a recess or groove formed in the shank. The mating portion may be in the form of a projection adapted to be received in the channel. Preferably where there is more than one channel the mating portion provides the corresponding number of projections. The projections may be spaced around an inner surface of the blind bore and are spaced to correspond with the spacing of the channels.

In another aspect of the invention, the shank is formed by a thin walled hollow tube, wherein each channel is formed/cut into the thin wall. The mating portion may be in the form of a pin extending across the blind bore, wherein the pin is simultaneously received in each channel. Where there are two or more channels in the shank, the pin may extend between the channels when the shank is received in the base plate.

The bolt head may have a recess adapted to receive a tool, the tool being used to move the bolt between the receiving position and the locked position. The recess may have a unique shape to provide added security.

The biasing means may act to bias the panel away from the vehicle when the panel is releasably secured to the vehicle.

The biasing means may act on the bolt head to bias it away from the base plate when the panel is releasably secured to the vehicle.

The biasing means may be in the form of a resilient material which is compressed when the panel is releasably secured to the vehicle.

The biasing means may be in the form of a ring or washer wherein at least a portion of the ring/washer is made from a resilient material.

In another embodiment the biasing means is in the form of a spring.

The biasing means may increase the shock absorbing characteristics of the panel. The compressibility of the biasing means allows the panel to absorb shock while retaining the fasteners in the locked position.

The thickness of the biasing means may be varied to vary the shock absorbing characteristics of the panel assembly.

The thickness of the biasing means may be varied to vary the biasing force acting on the panel.

The compressibility of the biasing means may be varied to vary the shock absorbing characteristics of the panel assembly.

The compressibility of the biasing means may be varied to vary the biasing force acting on the panel.

The plate body may be planar in shape. The plate body may have an inner surface which is complementary in shape to the exterior of the vehicle to which it will be fitted. The plate body may be complementary in shape to the exterior of the vehicle to which it will be fitted.

When the panel is secured to the vehicle there may be a gap between the panel and the exterior.

When the panel is secured to the vehicle there may be a gap between the inner surface of the panel and the exterior surface of the vehicle. Under normal conditions the gap is maintained such that the panel is not in direct contact with the exterior surface of the vehicle.

The gap may be 2 mm to 50 mm. Preferably the gap is 5 mm. The gap may be substantially uniform across any position of the panel. In one embodiment, the gap may be governed by the fastener. In another embodiment the gap may be governed by the biasing means. The gap may be governed by the both the fastener and the biasing means.

When the fastener is in a releasably locked position, the biasing means causes the panel to be urged away from the base plate. As a result the bolt, which is mounted to the panel, is also urged away from the base plate. With this arrangement the pin remains captive in the receiving portion of the channel, minimising the likelihood of the pin from re-entering the channel portion and permitting the bolt to disengage the mating portion to loosen or release the panel.

The present invention provides a panel assembly comprising:
 at least one panel adapted to be secured to a surface;
 a plurality of fasteners to secure the panel to the surface;
 wherein each fastener is associated with a biasing means to retain the fastener in a locked position when the at least one panel is secured to the surface.

The at least one panel of the panel assembly may provide protection for a vehicle.

The at least one panel of the panel assembly may provide an advertising medium mounted to the surface.

The present invention provides a panel assembly comprising:
 at least one panel, each of the at least one panel having a plate body adapted to be secured to a vehicle;
 a plurality of fasteners to secure the plate body to the vehicle;
 wherein each fastener is associated with a biasing means to retain the fastener in a locked position when the at least one panel is secured on the vehicle.

Preferably a gap is maintained between the plate body and the vehicle when the panel is mounted thereto.

The present invention further provides a protection system for covering at least a portion of an exterior surface of the vehicle, the protection system comprises one or more panels as herein described.

The present invention further provides an advertising system which may be mounted to at least a portion of a vehicle, the advertising system comprises one or more panels as herein described. The present invention allows for the rapid deployment and removal of advertising from a vehicle, without the need of a skilled technician.

The present invention further provides a panel assembly in the form of an advertising system which may be mounted to a surface, the advertising system comprises one or more panels as herein described. The present invention allows for the rapid deployment to and removal of advertising from the surface, without the need of a skilled technician.

The panel may have indicia thereon, or may be embossed or otherwise marked. This indicia/embossing/markings may be for purposes of advertising or to decorate the vehicle. The panels may incorporate a light such as a backlight.

The panel may be made from a clear material, and may be particularly suited to be fitted to a window.

The panel may be made from a clear material, and incorporate a light such as a backlight to enable illumination of the indicia/embossing/markings for the purposes of advertising or to decorate the vehicle.

The fasteners may be positioned on the panel to ensure maximum protection to the vehicle from damage, and/or to ensure a robust mounting of the panel on to the vehicle.

The fasteners may be positioned on the panel to ensure maximum protection to the vehicle from damage. For instance, those parts of the exterior of the vehicle which are particularly prone to damage may have strategically positioned fasteners thereabout enhancing the shock absorbing characteristics.

The number of fasteners used to secure a panel to the vehicle will be dictated by the weight of the panel, the heavier the panel the greater number of fasteners may be required. The size of the base plate may be increased to provide a greater surface which may be mounted to the exterior surface of the vehicle, providing a stronger mount and enabling heavier panels to be secured to the vehicle.

The panels may be trimmed to size, may be painted and/or may be wrapped.

The panels may be formed from bullet proof material, or may have a layer of bullet proof material secured thereto.

The panel assembly may comprise spacing means to provide a means of spacing the panel from the vehicle's exterior surface. The spacing means may maintain a gap between the panel and the exterior surface of the car. Preferably the gap is 5 mm.

The spacing means may be thicker than the gap between the panel and the vehicle's exterior adjacent the fasteners such that additional biasing force.

In one aspect the spacing means is in the form of a resilient material, such as foam or rubber, located between an inner surface of the panel and the exterior surface of the vehicle. The resilient material may also enhance the shock absorbing characteristics of the panel.

In another aspect the spacing means is in the form of a spacer located between an inner surface of the panel and the exterior surface of the vehicle. The spacer may be in the form of a doubled sided suction cup wherein one suction cup engages the exterior surface and the other suction cup engages the inner surface of the panel. The spacer may be in the form of a single sided suction cup wherein the suction cup engages either the exterior surface of the vehicle or the inner surface of the panel, the single side suction cup being adapted to be releasably secured to the other of the exterior or inner surfaces.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which.

In the drawings, like structures are referred to by like numerals throughout the several views. The drawings shown are not necessarily to scale, with emphasis instead generally being placed upon illustrating the principles of the present invention.

DESCRIPTION OF EMBODIMENTS

The present invention according to various embodiments, seeks to provide means to secure a panel to a surface, such as the exterior surface of a vehicle. The panel may be for a variety of purposes including a protective panel to protect the exterior of the vehicle, an advertising panel for mobile or static advertising, a combination of both protective and advertising. The present invention provides a robust means to secure a panel to the vehicle, while allowing for rapid installation and removal by a non-skilled person. The panel is secured to the vehicle without damaging the vehicle, and is able to remain in place regardless of the driving conditions or speed upon which the vehicle is travelling.

The present invention is advantageous in that it ensures a gap is maintained between the panel and the surface it is mounted to, which in the present embodiments is provided by a vehicle's exterior. As a result of the mounting arrangement all touch points are transferred through the mounting arrangement, and the panel does not directly touch the vehicle's exterior surface. This minimises damage that may be caused through rubbing or chaffing, and allows the exterior vehicle surface to be cooled, to breathe and moisture to dissipate. Furthermore, the gap could be minimal, such as 5 mm, minimising the likelihood of foreign objects from entering the gap, while allowing fine particles, such as sand, to pass therethrough should they enter the gap between the panel and the vehicle's exterior surface. The assembly of panel and fasteners enables the panel to be securely held with a consistent gap between the panel and the vehicle which allows air flow across the vehicle surface behind the panel for cooling of both the vehicle surface and the second fastening portion, including the base plate, adhesive pad.

Referring to FIGS. 1 to 7, the present invention according to an embodiment is in the form of a panel assembly for protecting the exterior of a vehicle. The panel assembly comprises a plurality of panels in the form of protective plates 11 which are releasably secured to the vehicle.

Figure 1:
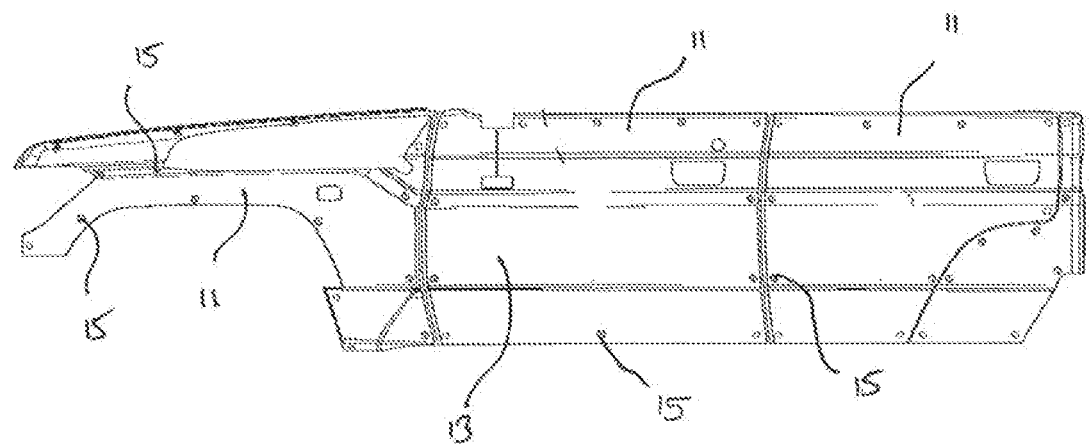
FIG. 1 is a side view of a set of four protective panels according to an embodiment of the present invention adapted to be fitted to the forward three, left side panels of a vehicle.
Figure 2:
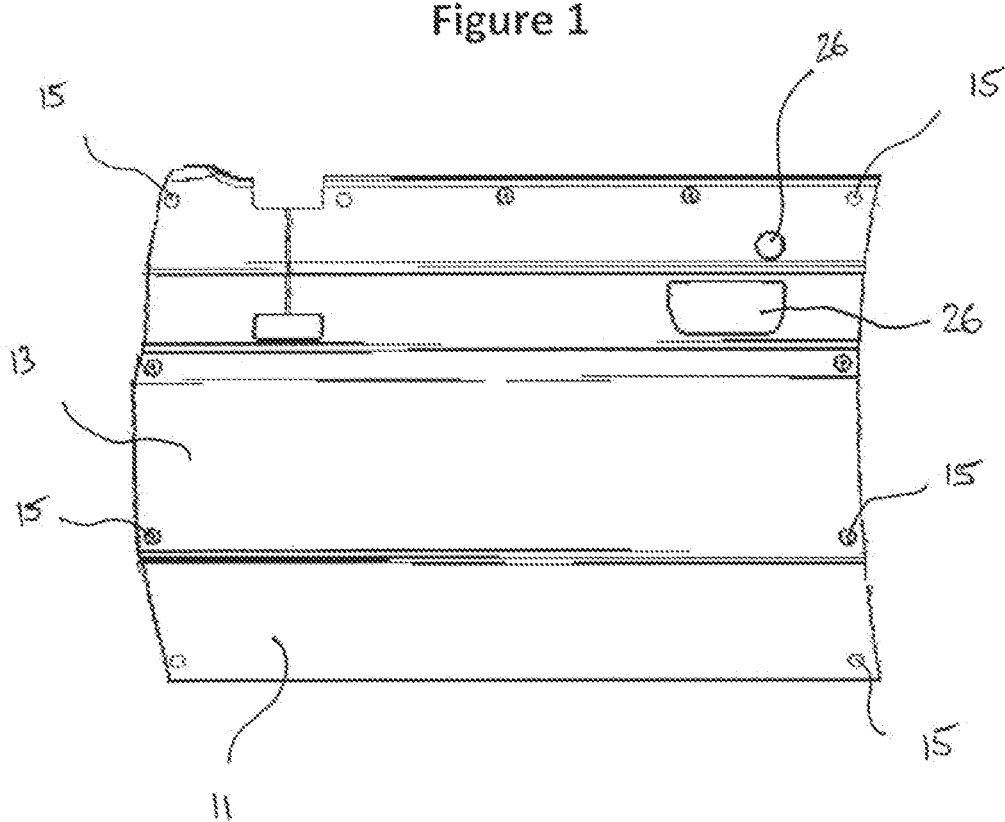
FIG. 2 is a side view of one of the protective panels of FIG. 1 adapted to be secured to a door of the vehicle.

In this embodiment each protective plate 11 is designed to substantially cover a specific body panel 25 of the vehicle. In this regard, each protective plate 11 is shaped so that its inner surface 12 is of a size, shape and profile to conform to an exterior surface of the corresponding body panel 25 of the vehicle so that the body panel 25 can be substantially covered by the respective protective plate 11. As specific to particular vehicle body panels 25, the protective plate 11 incorporates one or more cut-outs 26 to accommodate the vehicle's handles/locks/fuel cap/etc, as shown in FIG. 2.

The protective plate 11 deflects and absorbs impacts that may be encountered when the vehicle is driven. In a specific embodiment, the protective plate 11 deflects and absorbs impacts when the vehicle is driven in the off-road environment, protecting the vehicle's body panels 25 with the protective plate's outer surface 13. As the plurality of protective plates 11 can substantially cover the entire exterior of the vehicle to which it attaches, impacts from all angles and in all positions are deflected and/or absorbed by the relevant protective plate 11. This is enabled by the mounting arrangement.

Figure 6:
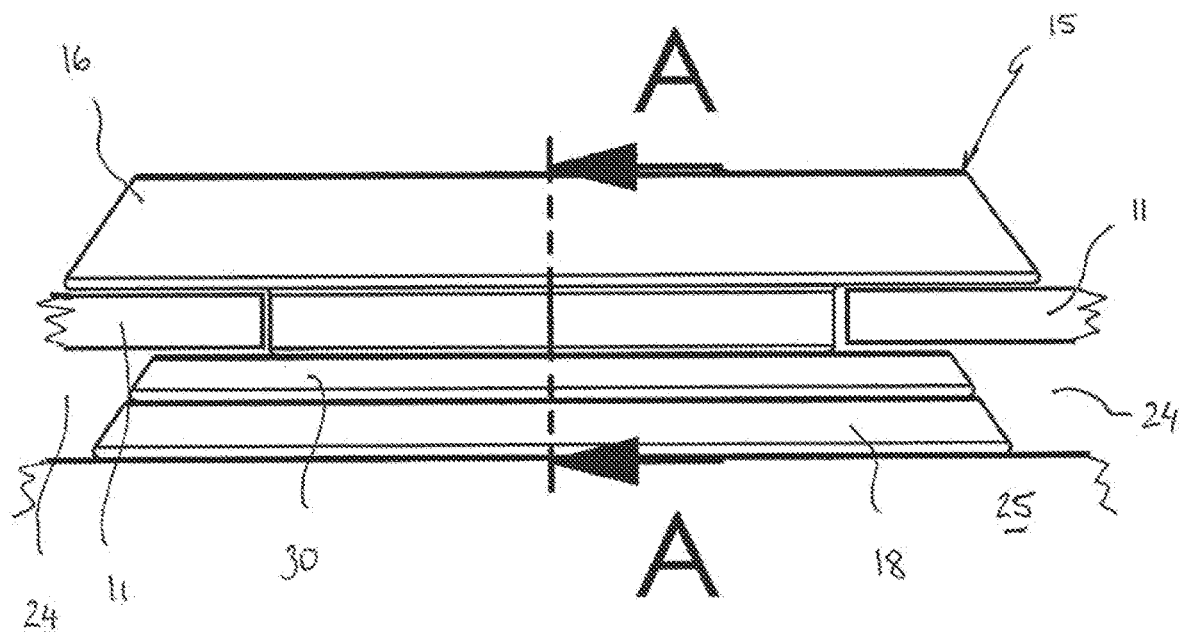
FIG. 6 is a side view of the fastener of FIG. 3 with the biasing ring, securing the panel to the vehicle.
Figure 7:
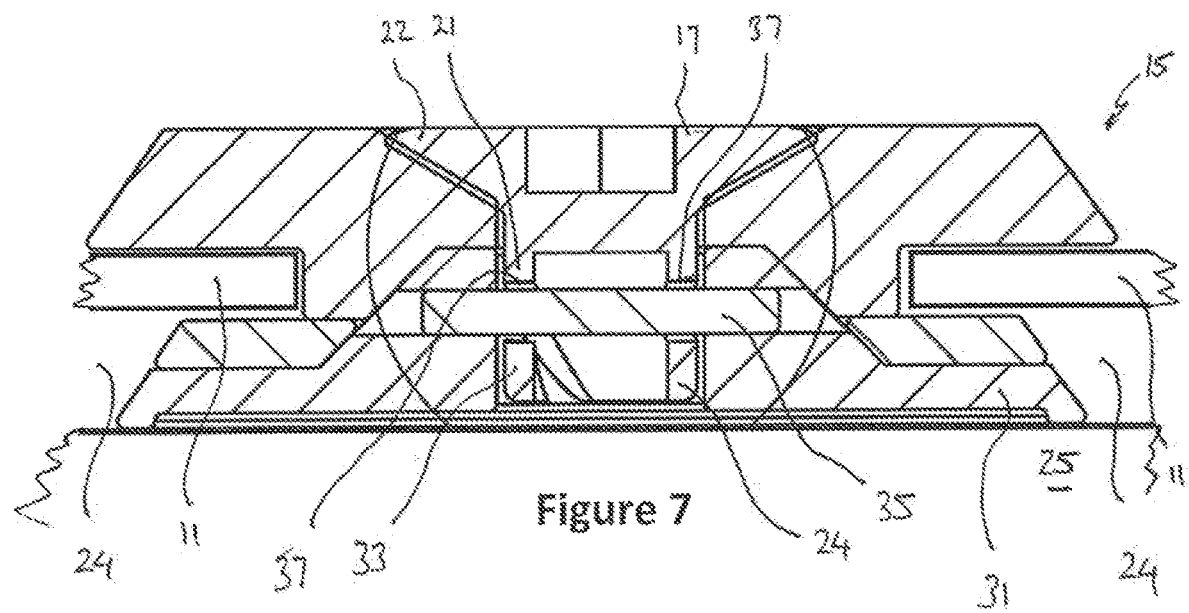
FIG. 7 is a cross sectional side view of FIG. 6 as taken through section AA.

As represented in FIGS. 6 and 7, the mounting arrangement ensures a consistent gap 24 is maintained between the protective plate 11 and the body panel 25 of the vehicle.

To secure the protective plates 11 in place on the corresponding body panel 25, each protective plate 11 comprise a mounting arrangement in the form of a plurality of fasteners 15. The fasteners 15 releasably secure the protective plate 11 at a plurality of positions over the vehicle's body panel 25. For example, on a rectangular shaped panel, a fastener 15 would be placed in at least each corner of the protective plate 11, as represented in FIG. 2.

In the present embodiment the protective plate 11 is plastic (such as ASA, ABS, Polycarbonate or a combination of each) so that it is light, inexpensive and easy to use. The protective plate 11 can be formed using thermoforming, injection moulding, gas assisted moulding, blow moulding, rotation moulding, compression moulding or spin casting.

In a different embodiment of the present invention, the protective plate 11 can be formed of Polylactic acid (PLA) plastic, Polyvinyl acetate (PVA) plastic or from composite materials.

Each fastener comprises a first fastening portion 16, incorporated with the protective plate 11, and a corresponding second fastening portion 18 adapted to be fixed to the exterior surface of the vehicle.

Each first fastening portion 16 comprise a threadless bolt 17 which provides a shank 21. The shank 21 is hollow and is formed with a thin wall. The bolt 17 has a head 22 from which the shank 21 extends. in this embodiment the shank 21 has two channels 23 extending therealong, and spaced equi-distance from each other.

Each channel 23 comprises a channel portion 27 which extends from a shank end 24 and terminates a distance from the shank end 24. A first end 38 of the channel portion 27 provides an opening 28 for reasons discussed below. The first end 38 is at the shank end 24.

The channel portion 27 has a helix shape and terminates at a receiving portion, which in this embodiment is in the form of a bore 37. The bore 37 is adjacent a second end 39 of the channel portion 27.

Figure 5:
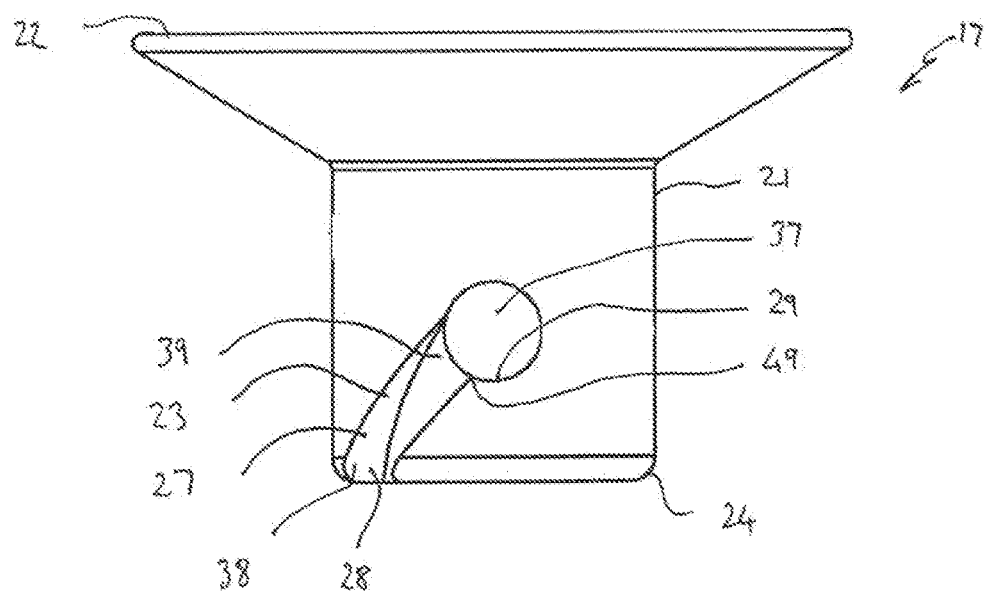
FIG. 5 is a side view of a bolt of the fastener of FIG. 4.

The channels are spaced so that the bore of one channel aligns with the bore of the other channel when the shank 21 is viewed from the side, as best shown in FIG. 5. Similarly, the opening 28 of one channel aligns with the opening 28 of the other channel Each second fastening portion 18 comprises a base plate 31. The base plate 31 is adapted to be fixed to the vehicle's exterior surface using a double sided adhesive pad 32. In particular, when fixed to the vehicle's exterior surface a base surface 34 of the base plate 31 is positioned adjacent the vehicle's exterior surface, wherein the adhesive pad 32 is located between the vehicle's exterior surface and the base surface 34 of the base plate 31. In other arrangements one or more adhesive pads 32 may be stacked on top of each other, as shown in FIGS. 22, 23, 26 and 27. As the adhesive pads are made from a resilient compliant material the combined thickness of the stacked adhesive pads accommodates surfaces having a slight curve, enabling a stronger bond between the vehicle's exterior and the base plate 31.

In one application the adhesive pad 32 provides a bond strength of at least 180 Newtons tensile pull force at 25° C. The adhesive pad 32 has a surface area of approximately 6 $cm^2$, a thickness of 1.6 mm and density of approximately 640 kg/m3. Such an adhesive pad 32 ensures adherence compliance with the vehicle panel surface in areas where the curvature of the vehicle panels contours and hence change of surface depth does not exceed 50% of the thickness of the adhesive pad 32.

The base plate 31 provides a blind aperture 33 therein. The blind aperture 33 is adapted to receive an end portion of the shank 21.

The base plate 31 provides a mating portion in the form of a pin 35 which extends across the blind aperture 33. Once the base plate 31 is secured to the vehicle's exterior, the pin 35 is orientated to be substantially parallel to that portion of the vehicle's exterior the base plate 31 is fixed.

When mounting the panel to the vehicle the opening 28 of each channel portion 27 of the shank 21 of the first fastening portion must align with the pin 35 of the second fastening portion before the shank 21 can be further received in the base plate 31. Once aligned with the openings 28, rotating the bolt 17 will result in the bolt 17 moving from a receiving position wherein the shank 21 first enters the aperture 33 to a locked position wherein the pin 35 has reached the end of the channel portion 27 and is received in the bore 37 of each channel 23, releasably securing the panel in place.

The bore 37 of the channel 23 has a first edge 29 closer to the shank end 24 compared to a first edge 49 of the second end 39 of the channel portion 27. As discussed below, this configuration assists in retaining the pin 35 in the bore 37, to releasably secure the protective plate 11 in place.

To further assist in retaining the protective plate 11 in a releasably secured condition, the panel assembly further comprises a biasing means. The biasing means acts on the protective plate 11, which urges the bolt 17 away from the base plate 31 when the protective plate 11 is releasably secured to the base plate 31. The biasing means is in the form of a washer 30 formed of a resilient material. The washer 30 is compressed when the bolt 17 is releasably secured to the base plate 31. The biasing means also increases the shock absorbing characteristics of the panel assembly.

The biasing means may also assist in maintaining a gap between the panel and the body panel of the vehicle.

In alternate embodiments the protective plate assembly also comprise a spacing means in the form of a plurality of spacer devices 41. The spacer devices 41 assist to maintain a gap between the protective plate 11 and the exterior of the car. The spacer devices 41 also minimise any vibration/rattling the panel 11 may otherwise experience, particularly at high speeds. In other arrangements the spacer devices may be in the form of foam or rubber pads. One or more foam pads may be secured to the vehicle's exterior surface at places where repetitive impact is likely, such as around door handles. The foam pads add additional impact absorption to the panel assembly.

When securing the protective plate system to a vehicle's exterior for the first time, the base plates 31 must first be fixed to the vehicle's exterior surface at the appropriate locations. Once fixed, the base plates 31 are able to remain on the exterior allowing for repeated installation and removal of the protective plates 11. As the base plates 31 are relatively small and not intrusive, they have minimal effect on the aesthetics and performance of the vehicle.

When installing the protective panel 11 to its associated vehicle panel, the shank end 24 is first located adjacent the blind aperture 33 of the base plate 31. As may be required, the bolt 17 is rotated until the opening 28 of each channel portion 27 aligns with the pin 35 whereupon the bolt 17 is in the receiving position and the pin 35 can be received in each channel 23.

Using a tool (not shown) to engage a tool recess 53 in the bolt head 22, the bolt is rotated causing the pin to travel along each channel portion 27 from the first end 38 to the second end 39, resulting in the compression of the washer 30. As this occurs the shank end 24 is received further in the blind aperture 33. The tool recess 53 may be configured to minimise the likelihood of unauthorised tampering.

Further rotation of the bolt 17 results in the pin 35 being received in each receiving portion of the channel, namely the bore 37, wherein the bolt is in the locked position. When each bolt 17 of the protective plate 11 is in the locked position the protective plate 11 is releasably secured to the vehicle.

As part of the installation process, a number of spacer devices 41 may first be installed on either the inner surface 12 of the protective plate 11, or the vehicle's exterior surface over which the protective panel is to be fitted.

Figure 8:
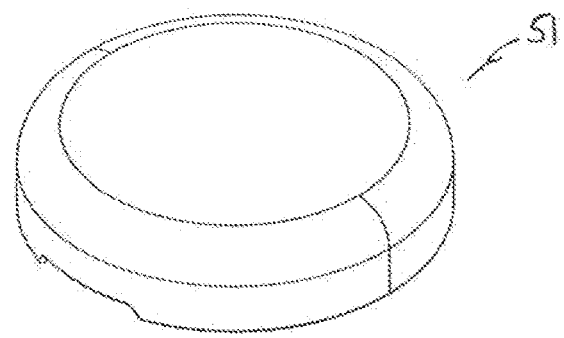
FIG. 8 is a perspective view of a cover for a base plate of the fastener of FIG. 4.
Figure 9:
FIG. 9 perspective view of a spacer device.
Figure 10:
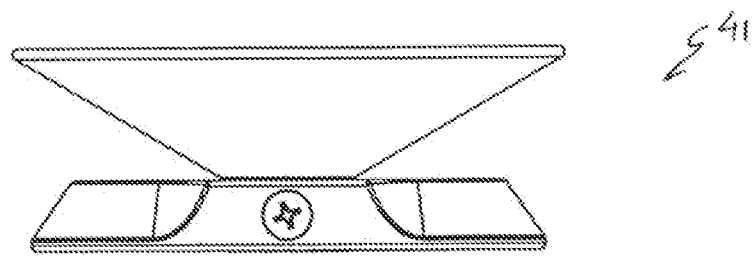
FIG. 10 is a side view of FIG. 9.
Figure 11:
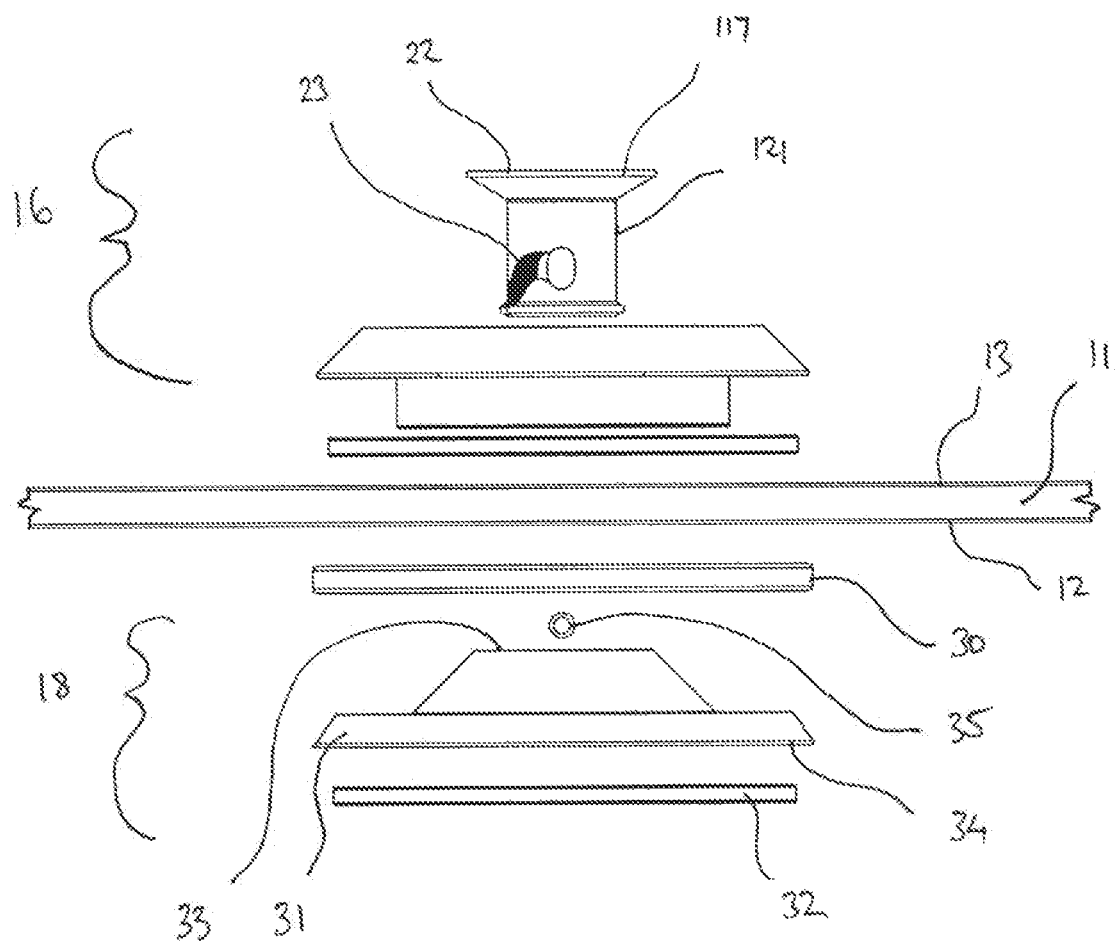
FIG. 11 is an exploded view of a fastener according to a second arrangement, a panel, a biasing ring and adhesive pad.
Figure 12:
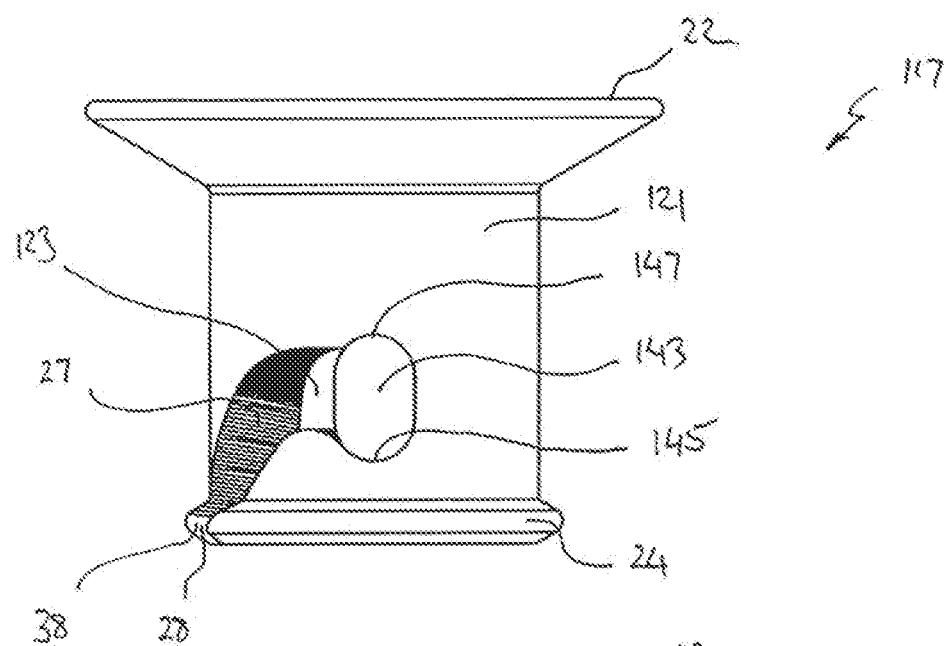
FIGS. 12, 13, and 14 are side views (angularly displaced) of a bolt of the fastener of FIG. 11.
Figure 13:
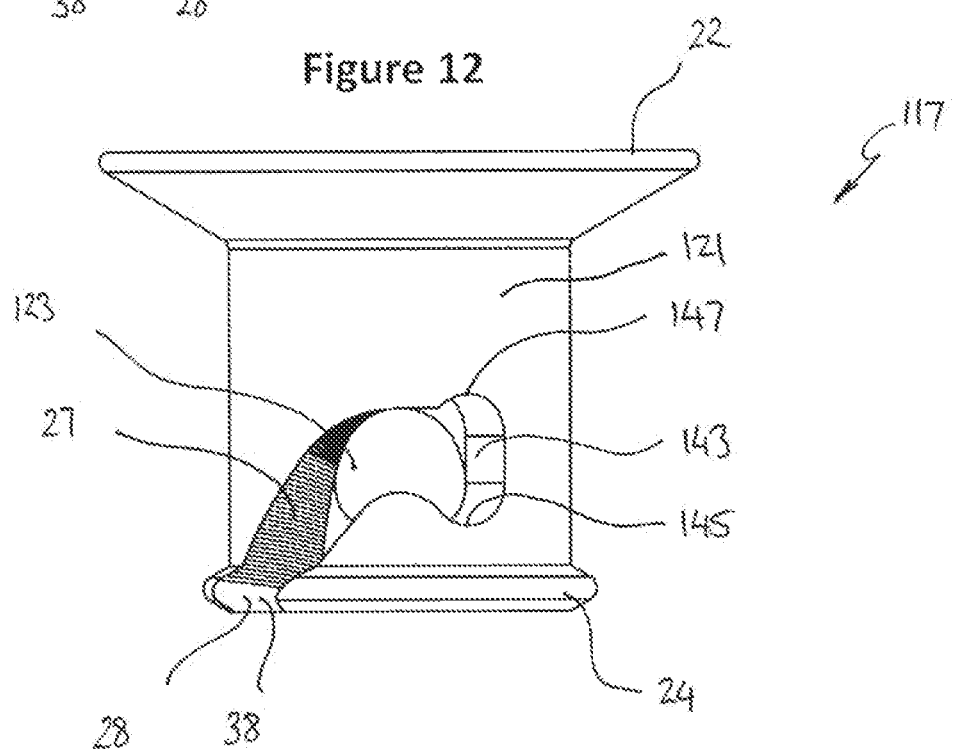
Figure 14:
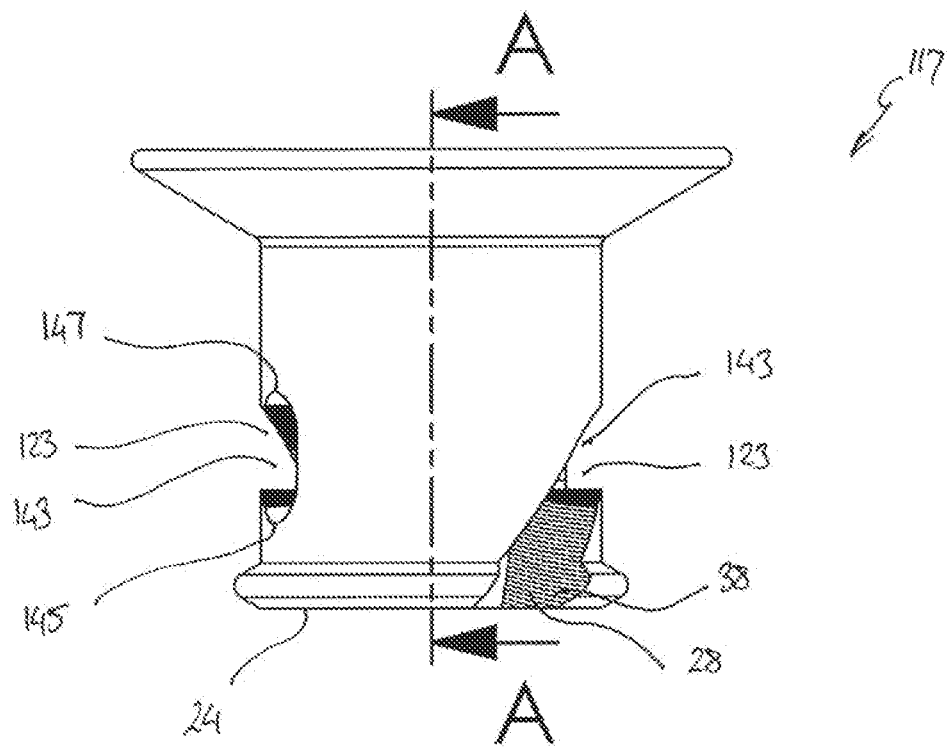
Figure 15:
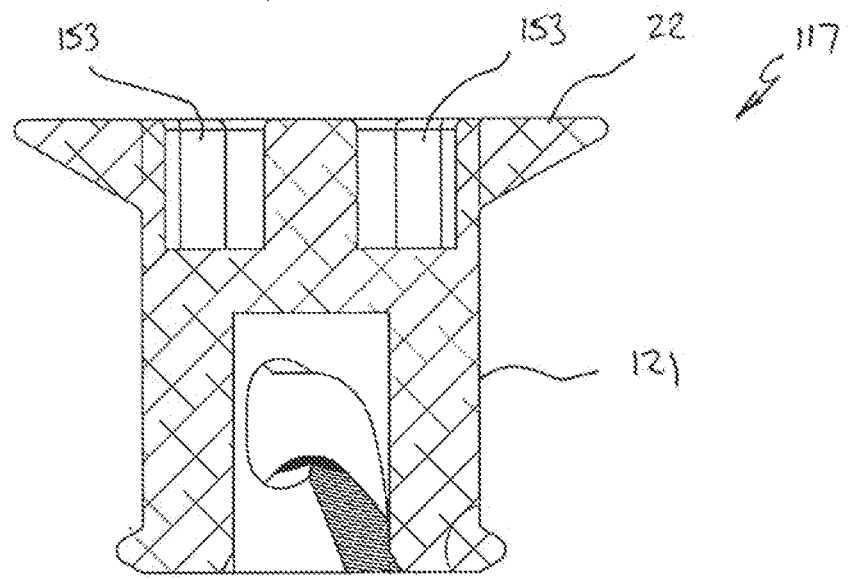
FIG. 15 is a cross sectional side view of FIG. 14 through section AA.
Figure 16:
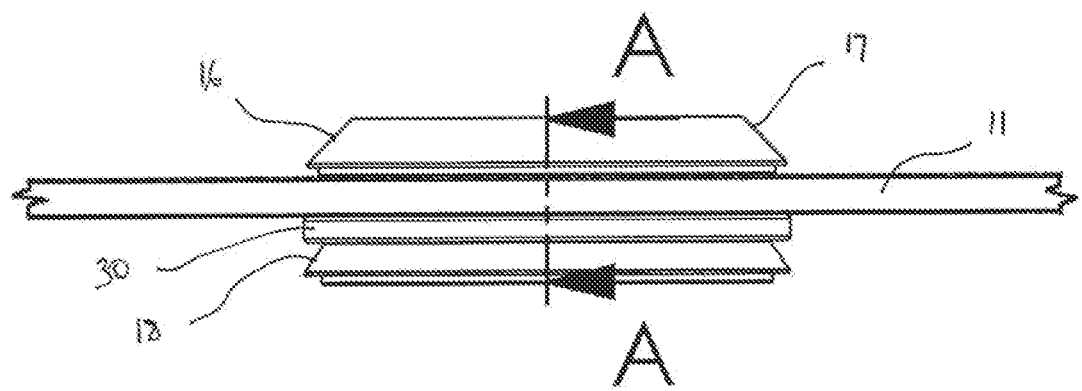
FIG. 16 is a side view of the assembled arrangement shown in FIG. 11.
Figure 17:
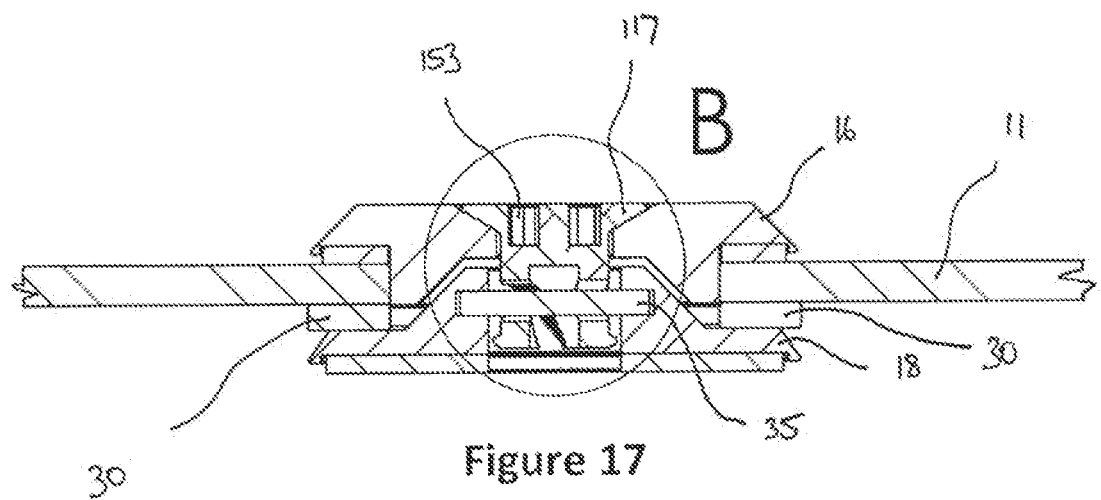
FIG. 17 is a cross sectional side view of FIG. 16 taken through section AA.
Figure 18:
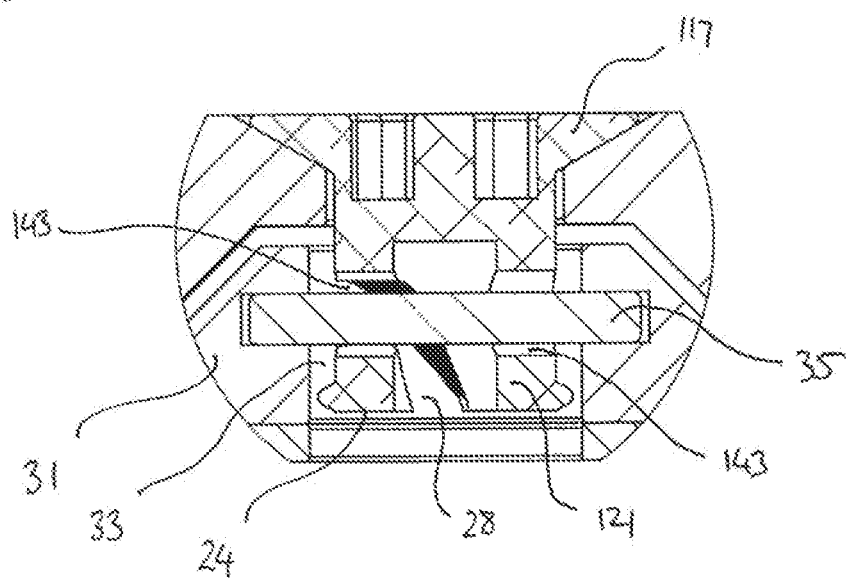
FIG. 18 is a close up view of area "B" marked in FIG. 17.
Figure 19A:
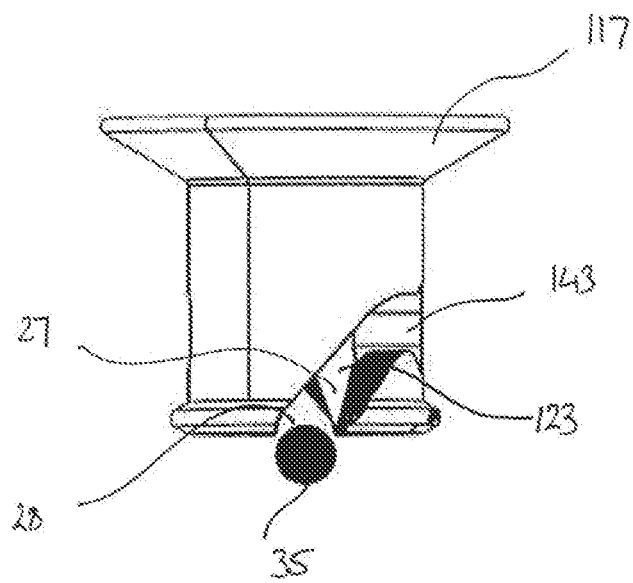
FIG. 19a is a side view representation and FIG. 19b is a bottom view representation depicting the relationship between channels of a first fastening portion and a pin of a second fastening portion as the pin is being received in an opening of each channel wherein the fastener is in the receiving position.
Figure 19B:
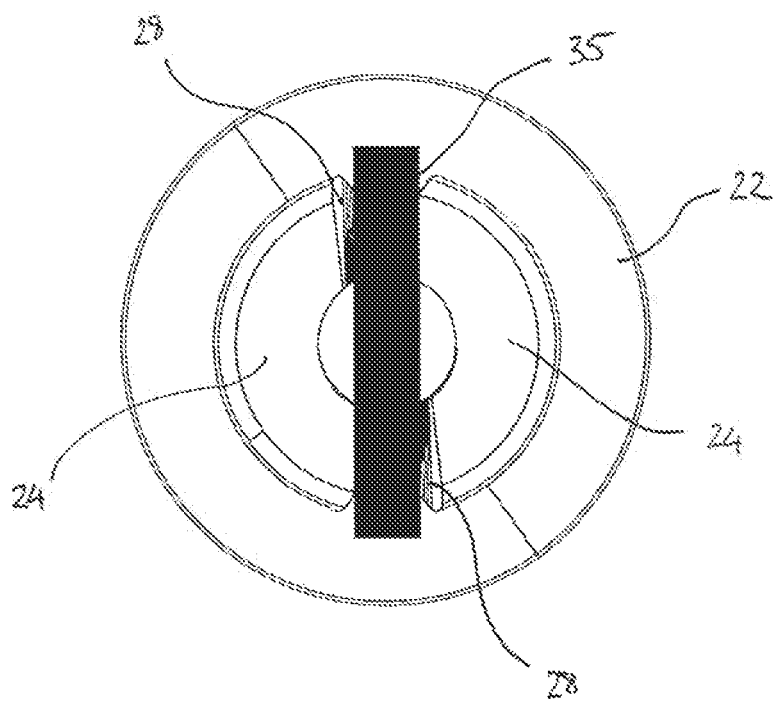
Figure 20A:
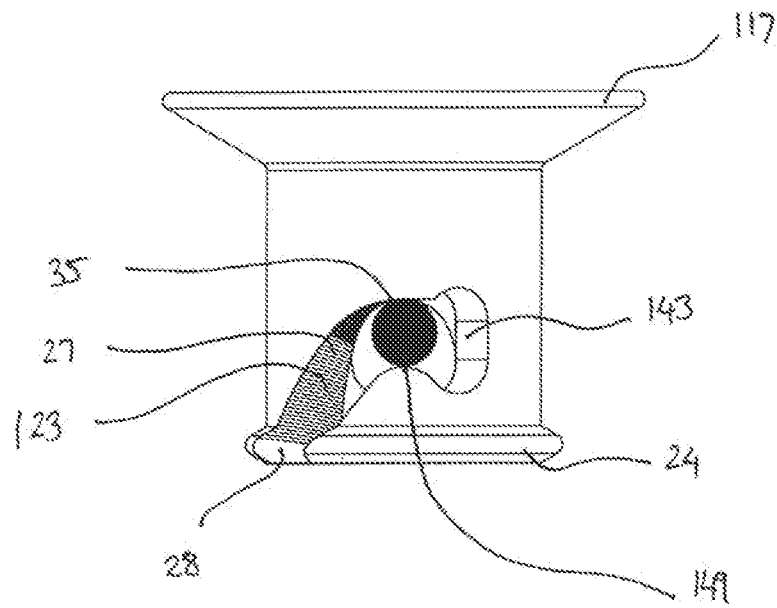
FIG. 20a is a side view representation and FIG. 20b is a bottom view representation depicting the relationship between the pin and the channels as the pin reaches the end of a channel portion of each channel.
Figure 20B:
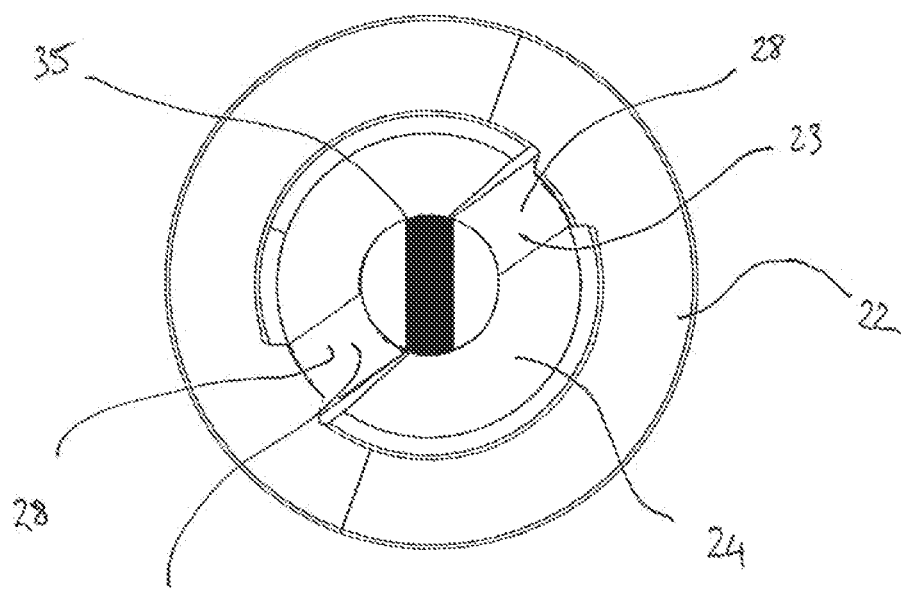
Figure 21A:
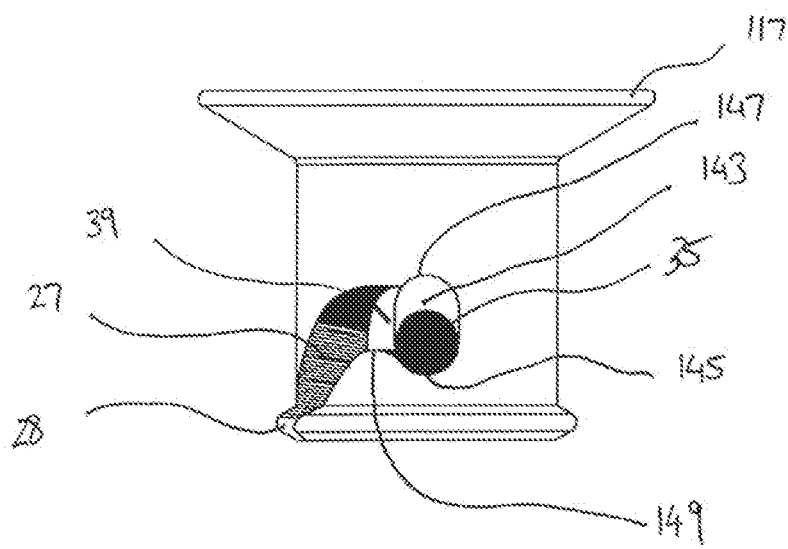
FIG. 21a is a side view representation and FIG. 21b is a bottom view representation depicting the relationship between the pin and the channels once the pin is received in a slot of a receiving portion of each channel whereupon the fastener is in a locked position.
Figure 21B:
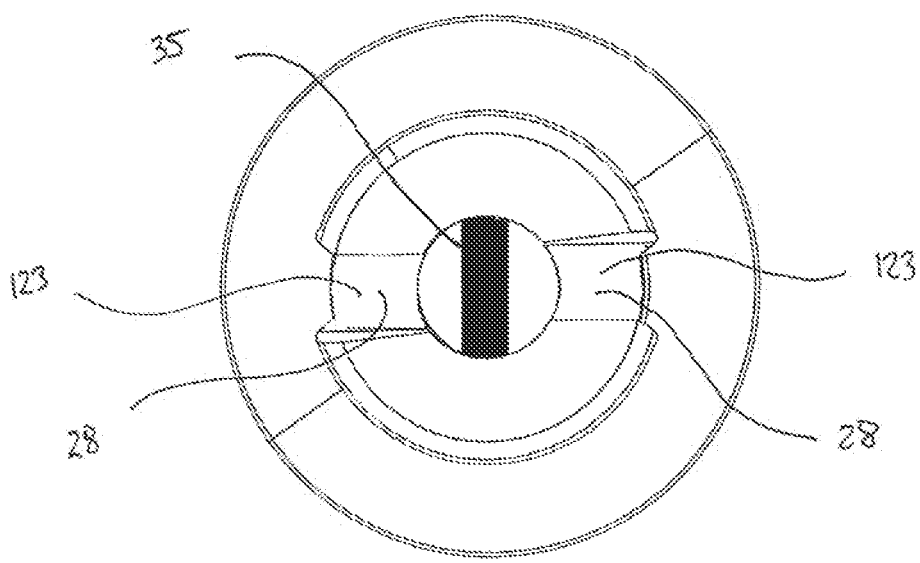
Figure 22:
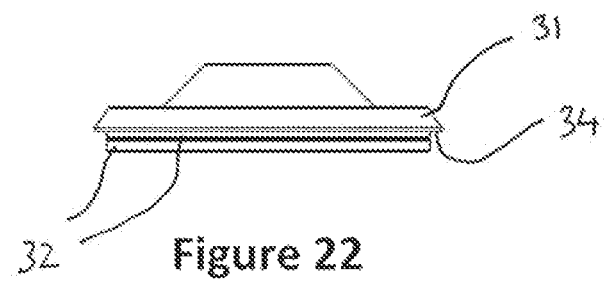
FIG. 22 is a side view of the base plate used in the embodiments shown in FIGS. 4 and 11, in combination with two adhesive pads.
Figure 23:
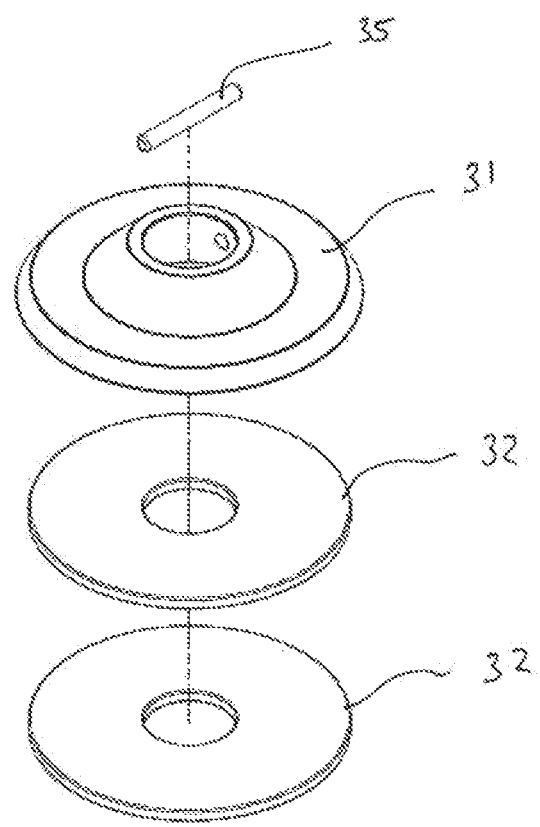
FIG. 23 is an exploded perspective view of FIG. 22.
Figure 24:
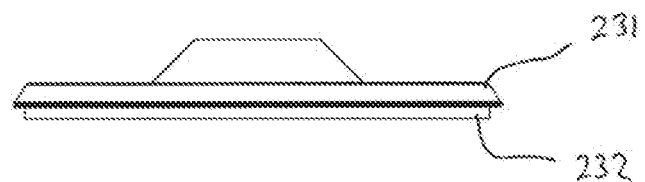
FIG. 24 is a side view of an oval base plate in combination with an adhesive pad.
Figure 25:
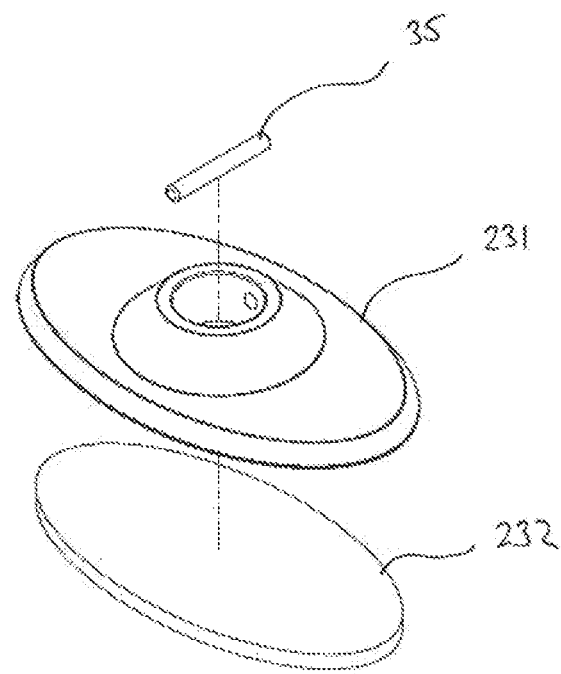
FIG. 25 is an exploded perspective view of FIG. 24.
Figure 26:
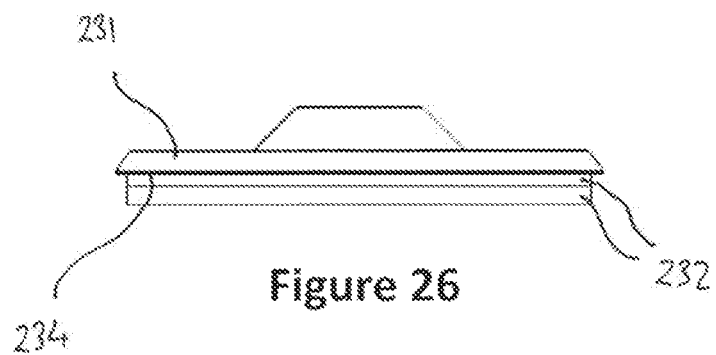
FIG. 26 is a side view of the oval base plate shown in FIG. 24 in combination with two adhesive pads.
Figure 27:
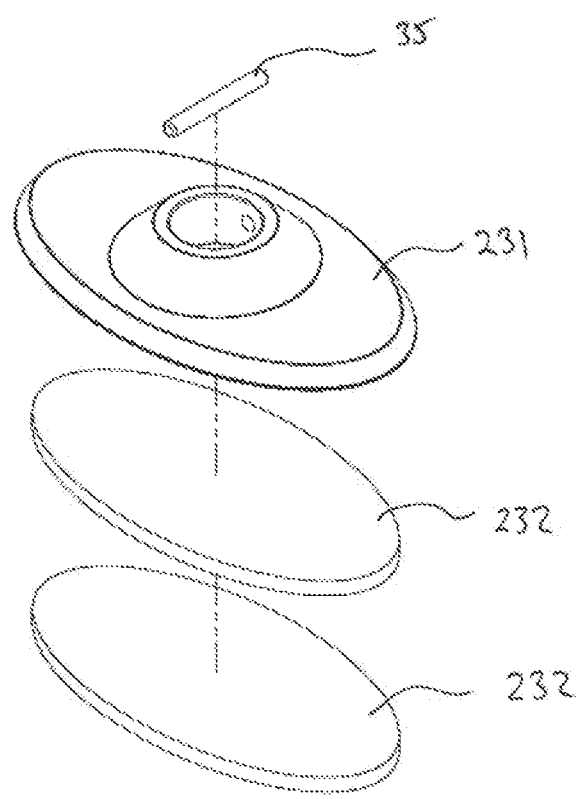
FIG. 27 is an exploded perspective view of FIG. 26.

As shown in FIG. 8, the panel system has a cover 51 which can be fitted over the base plate 31 when the protective plates 11 are removed. The cover 51 protects the base plate and improves the aesthetic look of the vehicle when the protective plates are removed. The base cover 51 may be colour coded to match the paintwork of the vehicle to further improve the aesthetics.

To remove the protective plate 11 from the vehicle's exterior the reverse process is undertaken.

A different arrangement of a bolt 117 to the bolt 17 discussed above is shown in FIGS. 11 to 21. The difference between bolt 117 and the bolt 17 as discussed above and shown in FIGS. 1 to 7, is the configuration of the end of the channel.

As best shown in FIGS. 12 to 15, a receiving portion of the channel 123 is in the form of a slot 143. The slot 143 is located at the second end 39 of the channel portion 27 and receives the pin 35 whereupon the bolt 117 is in the locked position.

The slot 143 has a first end 145 located closer to the shank end 24 than a first edge of the second end 39 of the channel portion 27. The slot 143 has a second end 147 located closer to the bolt head 22 than a second edge of the second end 39 of the channel portion 27. In this particular arrangement the longitudinal axis of the slot 143 is parallel to the axis of the bolt 117.

The inclusion of the slot 143 enhances the ability of the protective panel 11 to absorb impact and remain secured relative to the vehicle. Once the protective plate 11 is installed, impact on the protective plate 11 can be absorbed by the fastener 15. An impact in the region of the fastener 15 causes the slot 143 to move relative to the pin 35 whereupon the protective plate 11 moves closer to the vehicle's exterior. Upon experiencing an impact, the pin 35 may be caused to move from the first end 145 of the slot 143 towards/to the second end 147 of the slot 143. This further compresses the washer 30 absorbing the impact. Once the impact ceases, the biasing nature of the washer 30 causes movement of the pin 35 relative to the slot 143, whereupon the pin 35 returns to the first end 145 of the slot.

In some applications, or at some positions on the vehicle, the washer 30 may be required to meet different impact conditions. In these circumstances the material from which the washer 30 may be made may be selected from a material providing the required properties (resilient foam, D30 materials, impact protective foams).

The arrangement of bolt 117 also accommodates impacts of high frequency.

Figure 31:
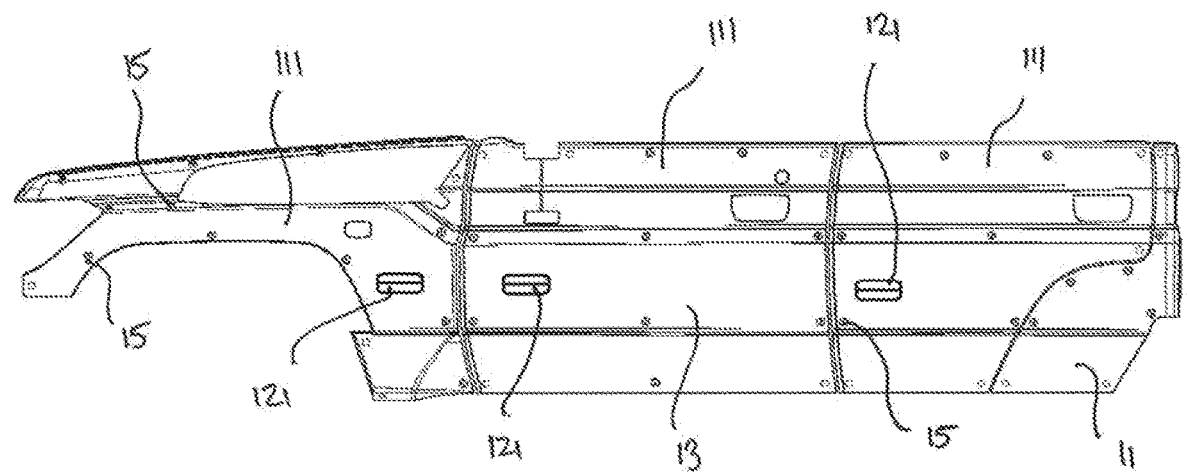
FIG. 31 is a side view of a set of four protective panels according to a further embodiment of the present invention adapted to be fitted to the forward three, left side panels of a vehicle, wherein three panels have a pressure venting device incorporated therein.

Referring to FIG. 31, a further arrangement of the protective plate 111 is shown. The protective plate 111 is similar to that shown in FIGS. 1 and 2 with the difference being that each of the larger protective plates incorporates a pressure equalising device, such as a vent 121. Each vent 121 allows the venting of air out from behind the panel thereby equalising the pressure on either side of the panel.

When the vehicle is travelling along the road at high speed the localised air pressure across the surface of the protective plate 111 can vary significantly depending on the vehicle speed, wind direction and surrounding environment. These changes in the localised air pressure can create both "push" and "pull" forces on the protective plate 111 depending on the pressure differential between the outside of the protective plate and the inside of the protective plate. In addition when a large vehicle, such as a truck, passes the vehicle in the opposite direction this creates additional increases in localised pressure across the protective plate which ensuing increases in the push and pull forces caused by the pressure differential between the outside surface and the inside surface of the plate. The venting device 121 enables faster equalisation of the pressure on either side of the protective plate and hence reduces the forces acting on the plate.

The pressure equalising device also assists with removing hot air from behind the protective plate 111 when operating in hot climates. This improves the thermal insulation and reduces the effect of the high ambient temperature on the other components of the present invention.

Figure 32:
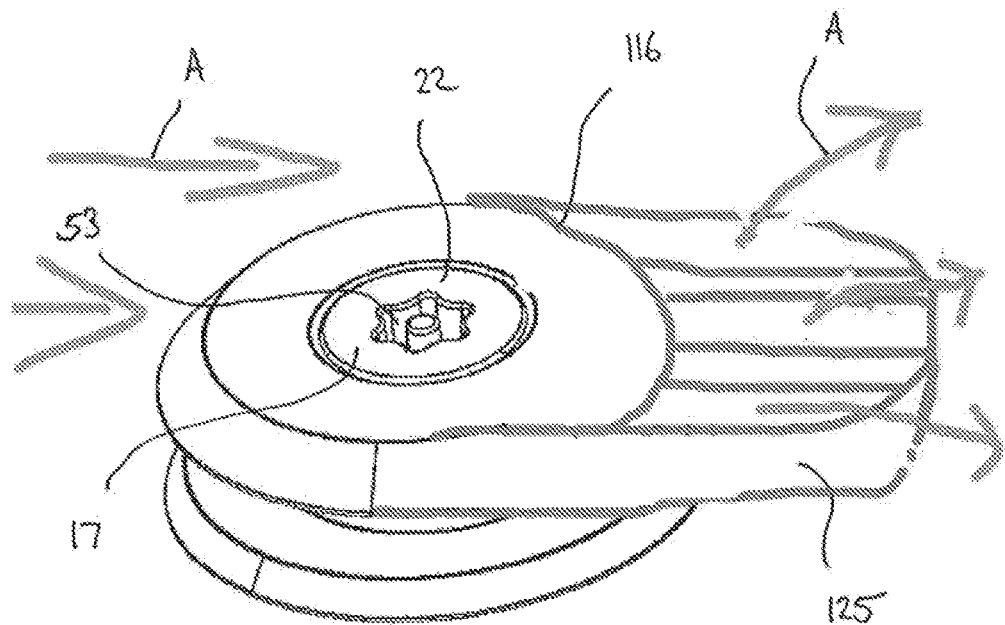
FIG. 32 is a perspective view of a fastener according to a further arrangement used to secure the protective plates to the vehicle, wherein the top washer portion of the fastener is shaped to cause venting of pressure and air from behind the panel.

Referring to FIG. 32, a further arrangement of the first fastener portion 116 is shown. The first fastener portion 116 is similar to that shown in FIG. 3 with the difference being that the first fastener portion 116 has a tail section 125 extending away from a front edge of the first fastener portion 116, this being the leading edge of the first fastener portion 116 when the vehicle is travelling in a forward direction. The tail section 125 incorporates a plurality of apertures to allow the venting of air around the fastener when the vehicle is moving or stationary to enhance air cooling of the components of the present invention. The direction of the wind is indicated by arrows A.

Figure 3:
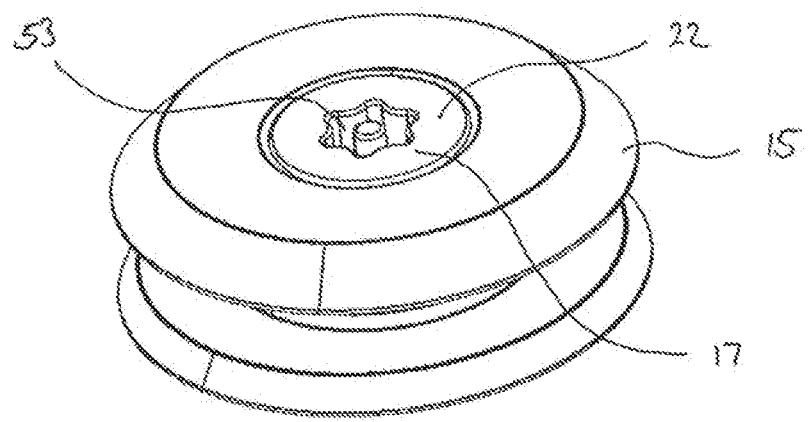
FIG. 3 is a perspective view of a fastener according to one arrangement used to secure the protective plates to the vehicle.
Figure 4:
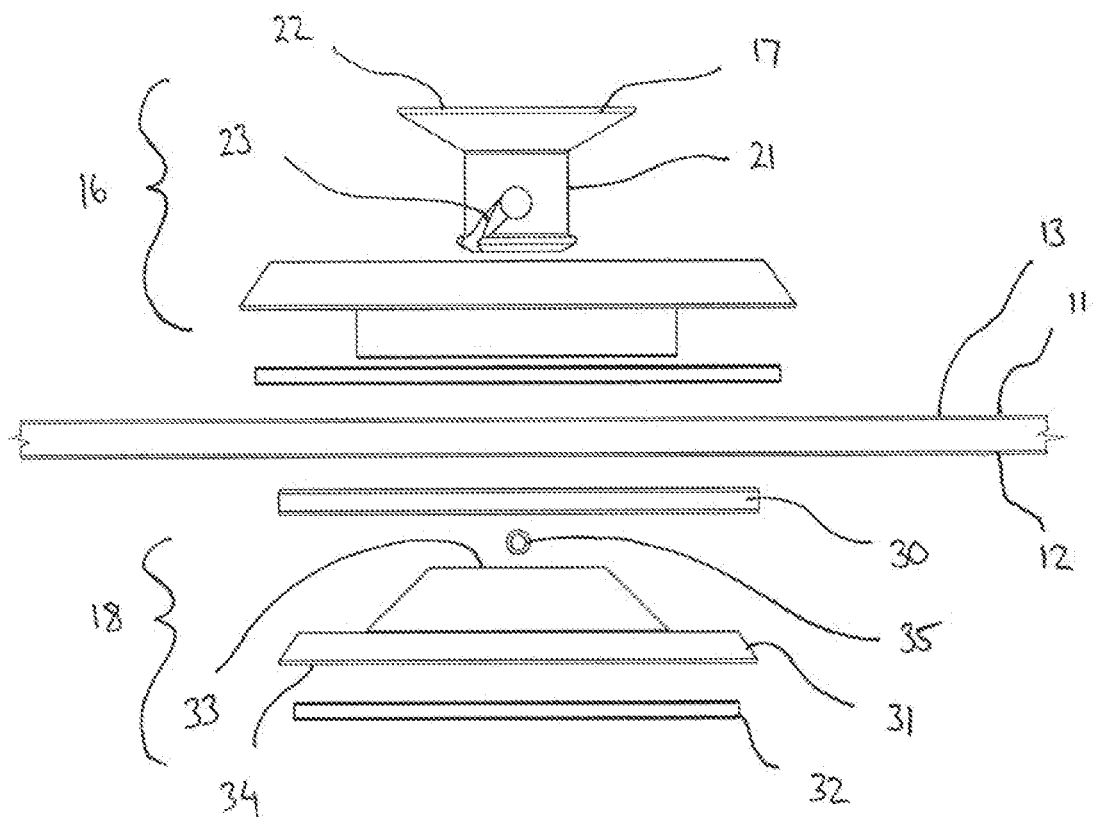
FIG. 4 is an exploded side view of the fastener of FIG. 3, a panel, a biasing ring and adhesive pad.

In another arrangement the plurality of apertures are provided by a separate washer which can be fitted to the first fastener portion 16 of FIG. 3 to achieve the same outcome.

The protective plates of the present invention are held in place on a vehicle in such a way that no direct contact point is made with the vehicle without first passing/dissipating some of the force through a compliant/shock absorbing material/medium.

An advantage of the present invention is that the protective plates incorporate a fastener which has a base plate that can be installed and removed without specialist knowledge or skill. The fastener uses an adhesive means, such as glue, adhesive mounts or tape, to affix base plates to the vehicle's exterior surface so that no drilling is required nor damage to the vehicle's exterior surface.

Each protective panel mimics the shape of the vehicle but sits off the vehicle surface for the most part with a consistent "air-gap" between the panel and the vehicle to overcome any chaffing between the vehicle panel and the protective plate. It also allows any moisture to evaporate and sand etc to fall through and not become trapped against the vehicle surface.

The panel assembly and in particular the mounting arrangement enables the panel to move in a separate range of motion to the surface of the vehicle, for example under conditions of high vibration, without causing chaffing or damage to the paint surface. Under conditions of high vibration, e.g. heavily corrugated unsealed roads . . . . Different materials have different resonance properties. If a panel was in contact with the vehicles surface and experiencing high frequency vibration, the panel and the vehicles body/surface will resonate at slightly different frequencies causing micro-abrasions on the paint surface where the panels are moving at a different rate to the vehicle body. This creates rub spots/dullness on the paint surface, particularly if it isn't perfectly clean between the panel and the paint.

The present invention allows the panel to vibrate at a different frequency to the vehicle. The mounting arrangement and the spacing of the panel off the vehicle (air gap) keeps the panel off the vehicle surface. As a result, when it vibrates at a different resonance, the paint is not damaged through rubbing/chaffing. The materials of the mounting arrangement may also be selected to incorporate vibration dampening properties.

The gap between the panel and the exterior of the vehicle provides various advantages including:
  ensures the panel does not contact the vehicle surface to ensure no rubbing or chafing;
  allows the absorption of impacts on the panels without the panel impacting the vehicle surface;
  allows water, dust and small stones to escape and vent from behind the panel;
  enables air flow around the Armor-Lock bases to assist with cooling of the bases;
  provides an insulator to reduce the internal vehicle temperature.

The plate body can be made from a variety of materials. Each plate body can also be fitted with layered Dyneema or similar in order to provide protection from bullets.

The protective plates of the present invention can be installed and removed as desired, but are able to remain on the vehicle, even at highway speeds. In this regard the protective plates may remain on the vehicle as opposed to having to remove them when in the urban setting. The protective plates may also include advertising media or other markings thereon, therefore providing a quick and easy alternative to changing the livery of a vehicle. The panels may incorporate a light such as a backlight which can be used to illuminate the panels. The backlight can also be switched on or off based on whether the vehicle is moving or stationary. In this case the backlight may be switched off when the vehicle is moving and re-activated when the vehicle is stationary. The panels may incorporate a digital screen to allow video or graphics to be displayed. The screen may conform to the shape of the panel.

The vehicle may be in the form of a truck, a trailer, a boat, a caravans or a car.

While the majority of impacts on a vehicle's exterior are along the sides of the vehicle, it is within the scope of the present invention to also provide a bonnet protective plate (not shown) and a rear panel/tail gate protective plate (not shown).

Most panels on a vehicle have one or more contoured areas which are curved. When securing the base plate to the vehicle's panel, it is critical that there is a strong bond between the base plate and the vehicle's exterior surface. Where the base plate is secured to a flat section of the vehicle's exterior surface, a strong bond can be readily achieved using an adhesive pad. However, not all sections to which the base plate is to be secured are flat, often having curved contours of varying radius.

For those smaller/tighter radius contoured sections of the vehicle panel a base plate 231 which is oval in shape can be used to ensure better compliance with the vehicle panel surface curvature and therefore provide a suitably strong bond. As most contours on a vehicle panel extend along the vehicle's longitudinal extent, having a base plate 231 which is longer in length (X direction) than in width (Y direction) provides a base surface 234 which has more surface area available for bonding across these contours.

Figure 28:
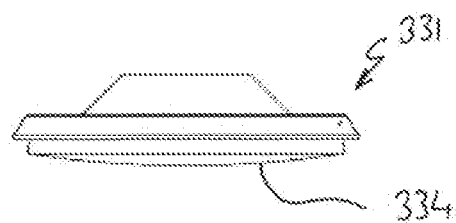
FIG. 28 is a side view of a base plate having a curved base surface.
Figure 29:
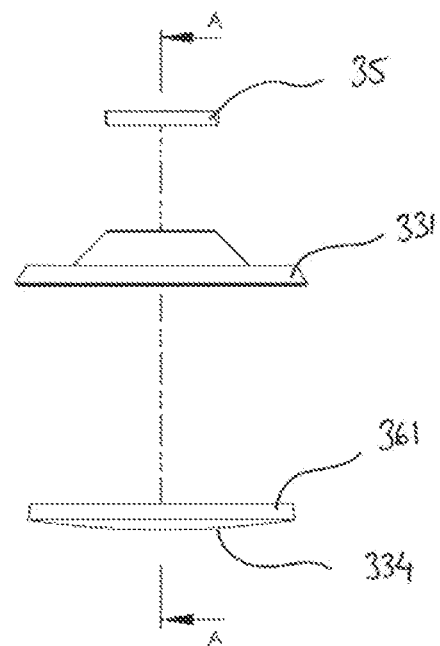
FIG. 29 is an exploded side view of a base plate having a base adapter providing a curved base surface.
Figure 30:
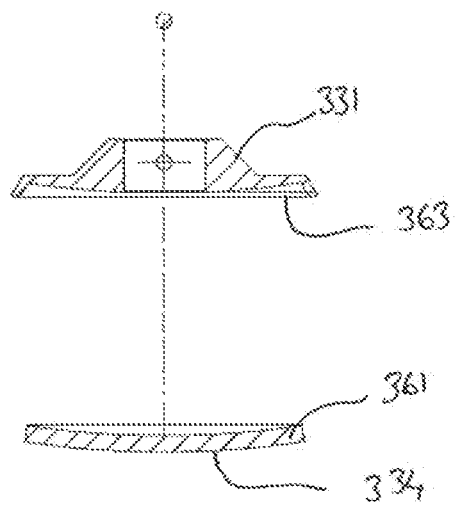
FIG. 30 is a cross sectional view of FIG. 29.

In another variation a base surface 334 of a base plate 331 may be convex, or concave in profile. As best shown in FIGS. 28 to 30, this may be incorporated in the base surface 334 of the base plate 331 (FIG. 28), or the base plate 331 incorporates a base adapter 361 which is received in a recess 363 of the base plate 331 (FIGS. 29 and 30).

In another variation the base plate may incorporate one or more sensors, such as a temperature sensor and/or a pressure sensor. These sensors can monitor the performance of the system and alert the operator that conditions may be exceeded. For instance, the temperature sensor may measure the temperature of the base and alert the operator if the base reaches a temperature which may compromise the bonding of the base plate to the vehicles surface. The sensors may communicate with an App on the operator's phone.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, combinations, formulations and methods are clearly within the scope of the invention as described herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. Furthermore, as would be known to the person skilled in the art various combination of features disclosed herein fall within the scope of the disclosure Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprise", "comprises," "comprising," "including," and "having," or variations thereof are inclusive and therefore specify the presence of stated features, integers, steps, operations, elements, and/or components, but do not preclude the presence or addition of one or more other features, integers, steps, operations, elements, components, and/or groups thereof.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Such variations are not to be regarded as a departure from the disclosure, and all such modifications are intended to be included within the scope of the disclosure.

It will be understood that when an element is referred to as being "connected" or "coupled" to another element, it may be directly connected or coupled to the other element or intervening elements may be present. As used herein the term "and/or" includes any and all combinations of one or more of the associated listed items.

The invention claimed is:

1. A panel assembly adapted to be secured to an exterior of a vehicle, the panel assembly comprises:
 a panel having a plate body;
 a plurality of fasteners to releasably secure the plate body to the exterior of the vehicle; and
 a biasing means;
 wherein the biasing means retains the fastener in a locked position when the panel is secured on the vehicle;
 wherein there is a gap is between the panel and the exterior of the vehicle when the panel is secured to the vehicle.

2. The panel assembly according to claim 1 wherein the biasing means biases the panel away from a exterior surface of the vehicle when the panel is releasably secured to the exterior surface.

3. The panel assembly according to claim 1 wherein the biasing means is in the form of a resilient material which is in a compressed state when the panel is releasably secured to the exterior of the vehicle.

4. The panel assembly according to claim 1 wherein the biasing means is in the form of one or more of the following: a ring or washer wherein at least a portion of the ring/washer is made of a resilient material a spring.

5. The panel assembly according to claim 1 wherein at least portions of the plate body are planar in shape, and has at least an inner surface which is complementary in shape to the exterior of the vehicle to which it will be fitted.

6. The panel assembly according to claim 1 wherein the panel incorporates one or more pressure equalisation devices in the form of vents.

7. The panel assembly according to claim 1 wherein there is a consistent gap between the inner surface of the panel and the exterior surface of the vehicle when the panel is secured to the vehicle whereby the panel is not in direct contact with the exterior of the vehicle.

8. The panel assembly according to claim 1 wherein each of the plurality of fasteners comprises a first fastening portion, incorporated with the plate body, and a corresponding second fastening portion adapted to be fixed to the exterior of the vehicle.

9. The panel assembly according to claim 8 wherein each second fastening portion is permanently or releasably attached to exterior of the vehicle.

10. The panel assembly according to claim 8 wherein the second fastening portion comprises a base plate adapted to be removably secured to the exterior surface of the vehicle wherein the base plate comprise a base surface which is positioned adjacent the vehicle's surface when fitted thereto, the base surface defines the outer perimeter and shape of the base plate, wherein the base surface presents a flat surface, a curved convex surface or a curved concave surface such that it has a profile complementary to the profile of the surface of the vehicle's panel to which the base plate is being attached.

11. The panel assembly according to claim 10 wherein the base plate provides a mating portion, the mating portion being adapted to co-operate with the at least one channel of the first fastening portion.

12. The panel assembly according to claim 11 wherein the mating portion comprises a blind aperture therein, the blind aperture being adapted to receive the shank, wherein the mating portion also comprises a pin which extends across the blind aperture, the pin being adapted to be received in the receiving portion of the channel when the fastener is in a locked position, whereupon the panel is releasably secured to the vehicle.

13. The panel assembly according to claim 8 wherein the first fastening portion comprises a shank adapted to lockingly engage the base plate, and a head from which the shank extends wherein a portion of the shank remote from the head has at least one channel extending there along, wherein the at least one channel extends from a first end portion of the shank and terminates a distance from the first end, wherein the channel has a channel portion which is of a helix shape, and may terminate at a receiving portion of the channel.

14. The panel assembly according to claim 13 wherein the receiving portion of the at least one channel is in the form of a hole.

15. The panel assembly according to claim 13 wherein the receiving portion of the at least one channel is in the form of a recess.

16. A panel for protecting at least an external portion of a vehicle, the system comprises at least one panel in the form of a protective plate which is adapted to be releasably secured to the vehicle to protect the external portion to which it is releasably secured, the at least one protective plate is spaced from the external portion of the vehicle such that there is a relatively uniform gap therebetween, the at least one protective plate is complementary in shape to the external portion of the vehicle it is adapted to cover, the at least one protective plate is releasably secured to the vehicle using at least one fastener, the protection system comprises a biasing means to retain the fastener in a locked position, retaining the panel in a secure position relative to the external portion of the vehicle.

17. A panel assembly for mounting a panel to an exterior surface of a vehicle, the panel assembly comprises:
at least one panel adapted to be releasably secured to the vehicle's exterior surface,
a mounting arrangement to releasably secure the at least panel to the vehicle's exterior surface,
a biasing means to retain the at least one panel in a releasably secured condition,
wherein there is a gap between the panel and the exterior when the panel is secured to the vehicle,
wherein the gap is maintained such that the panel is not in direct contact with the exterior of the vehicle.

18. The panel assembly according to claim 17 wherein the mounting arrangement comprises at least one first fastening portion and a corresponding second fastening portion, wherein the first fastening portion is incorporated with the at least one panel and the corresponding second fastening portion is adapted to be fixed to the exterior surface of the vehicle.

19. The panel assembly according to claim 18 wherein the channel comprises a channel portion and a receiving portion, wherein the channel portion extends along the shank in a helix like shape from the shank end, the channel portion has a first end, which provides the opening, and a second end, wherein the receiving portion is provided at or adjacent to a second end of the channel portion, the receiving portion is adapted to receive the mating portion, whereupon the bolt is in the locked position, whereupon the mating portion being received in the receiving portion the biasing means facilitates the retention of the mating portion in the receiving portion.

20. The panel assembly according to claim 19 wherein an edge of the receiving portion is closer to the shank end compared to a first edge of the second end of the channel portion, the mating portion being snugly received in the receiving portion against the edge thereof, wherein the receiving portion is in the form of a slot having a first slot end closer to the shank end than a first edge of the second end of the channel portion.

21. The panel assembly according to claim 17 wherein the first fastening portion comprises a threadless bolt which provides the shank, the bolt having a head from which the shank extends, wherein the shank provides a channel, the channel being adapted to receive a mating portion of the second fastening portion as the at least one panel is releasably secured to the vehicle's exterior surface, wherein the channel provides a passage along which the mating portion passes, wherein the channel guides the mating portion there along, as the bolt moves between a receiving position, whereby the channel receives the mating portion as the panel is positioned on the vehicle's exterior surface, and a locked position in which the panel is releasably secured to the vehicle's exterior, wherein the channel provides an opening for receiving the mating portion, the opening being at a shank end distal from the bolt head.

22. The panel assembly according to claim 21 wherein the mating portion comprises a blind bore for receiving the shank as the mating portion travels along the channel, the blind bore is provided by a base plate, the base plate being adapted to be fixed to the vehicle's exterior.

23. The panel assembly according to claim 21 wherein the shank is formed by a thin walled hollow tube, wherein each channel is formed/cut into the thin wall, and the mating portion is in the form of a pin extending across the blind bore, wherein the pin is simultaneously received in each channel, wherein two channels are formed in the shank, the pin extends between the channels when the shank is received in the base plate.

24. The panel assembly according to claim 17 wherein the biasing means acts to bias the panel away from the vehicle when the panel is releasably secured to the vehicle, the biasing means is in the form of a resilient material which is compressed when the panel is releasably secured to the vehicle, and is in the form of a ring or washer wherein at least a portion of the ring/washer is made from a resilient material, or is in the form of a spring.

25. The panel assembly according to claim 17 wherein the panel has an inner surface which is complementary in shape to the exterior of the vehicle to which it will be fitted, or wherein the panel is complementary in shape to the exterior of the vehicle to which it will be fitted.

* * * * *